US008757335B2

(12) United States Patent
Kaneda et al.

(10) Patent No.: US 8,757,335 B2
(45) Date of Patent: *Jun. 24, 2014

(54) DAMPER, WASHING MACHINE, AND WASHER/DRYER

(75) Inventors: Yoshinori Kaneda, Minato-ku (JP); Shinichiro Kawabata, Minato-Ku (JP); Koji Hisano, Minato-ku (JP); Hirokazu Izawa, Minato-ku (JP); Hiroshi Nishimura, Minato-ku (JP)

(73) Assignees: Kabushiki Kaisha Toshiba, Tokyo (JP); Toshiba Consumer Electronics Holdings Corporation, Tokyo (JP); Toshiba Home Appliances Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/593,206

(22) Filed: Aug. 23, 2012

(65) Prior Publication Data
US 2013/0042654 A1 Feb. 21, 2013

Related U.S. Application Data

(63) Continuation of application No. PCT/JP2010/072240, filed on Dec. 10, 2010.

(30) Foreign Application Priority Data

Feb. 24, 2010 (JP) ................................. 2010-038631
Jun. 3, 2010 (JP) ................................. 2010-127523
Aug. 23, 2010 (JP) ................................. 2010-186109

(51) Int. Cl.
*F16F 9/53* (2006.01)

(52) U.S. Cl.
USPC ......... 188/267.2; 188/267; 68/23.1; 68/12.06

(58) Field of Classification Search
USPC ............. 68/23.1–23.3, 12.06; 188/267–267.2
IPC .......................................................... F16F 9/53
See application file for complete search history.

(56) References Cited

U.S. PATENT DOCUMENTS 5,284,330 A 2/1994 Carlson
5,398,917 A 3/1995 Carlson
(Continued)

FOREIGN PATENT DOCUMENTS

CN 101709761 5/2010
CN 101709761 A * 5/2010
(Continued)

OTHER PUBLICATIONS

Extended European Search Report issued in EP 10846640.0 on Jul. 3, 2013.

(Continued)

*Primary Examiner* — Michael Barr
*Assistant Examiner* — Kevin G Lee
(74) *Attorney, Agent, or Firm* — DLA Piper LLP (US)

(57) ABSTRACT

A damper obtaining damping force by the frictional resistance imparted by the viscosity of the magnetic viscous fluid is disclosed. The damper is provided with a seal not only on one (lower side) of the axial outer sides of the yoke but also on the other (upper side) of the axial outer sides of the yoke to trap the magnetic viscous fluid within the magnetic viscous fluid filling portion at both axial outer sides of magnetic viscous fluid filling portion. Because the leakage of the magnetic viscous fluid can be prevented, no air is introduced into the magnetic viscous fluid filling portion, to allow the density of the magnetic viscous fluid within magnetic viscous fluid filling portion to be maintained at a favorable level and prevent degradation of damping force.

27 Claims, 24 Drawing Sheets

(56) References Cited

U.S. PATENT DOCUMENTS

| | | | |
|---|---|---|---|
| 5,492,312 A | 2/1996 | Carlson | |
| 6,151,930 A * | 11/2000 | Carlson | 68/12.06 |
| 6,202,806 B1 * | 3/2001 | Sandrin et al. | 188/267.1 |
| 6,340,080 B1 | 1/2002 | Carlson | |
| 6,390,253 B1 * | 5/2002 | Oliver | 188/267.2 |
| 6,394,239 B1 | 5/2002 | Carlson | |
| 6,471,018 B1 | 10/2002 | Gordaninejad | |
| 6,497,309 B1 * | 12/2002 | Lisenker | 188/267.2 |
| 6,823,971 B2 * | 11/2004 | Takeda et al. | 188/267.2 |
| 6,883,649 B2 * | 4/2005 | Lun | 188/267.2 |
| 7,219,781 B2 * | 5/2007 | Akami et al. | 188/322.19 |
| 8,387,420 B2 | 3/2013 | Kawabata | |
| 2002/0130002 A1 * | 9/2002 | Hopkins et al. | 188/267.2 |
| 2002/0185347 A1 * | 12/2002 | Pohl et al. | 188/267.1 |
| 2003/0233854 A1 * | 12/2003 | Matsuda et al. | 68/16 |
| 2004/0262106 A1 | 12/2004 | Manecke | |
| 2005/0211517 A1 | 9/2005 | Carlson | |
| 2008/0007012 A1 | 1/2008 | Jeong | |
| 2009/0050425 A1 * | 2/2009 | Murakami et al. | 188/267.2 |

FOREIGN PATENT DOCUMENTS

| | | |
|---|---|---|
| JP | 63-125243 | 8/1988 |
| JP | 8-19687 | 1/1996 |
| JP | 8-21482 | 1/1996 |
| JP | 10-214715 | 8/1998 |
| JP | 10214715 A * | 8/1998 |
| JP | 2002-502942 | 1/2002 |
| JP | 2005-502850 | 1/2005 |
| JP | 2006-029585 | 2/2006 |
| JP | 2006-57766 | 3/2006 |
| JP | 2006057766 A * | 3/2006 |
| JP | 2006-230591 | 9/2006 |
| JP | 2007-115835 | 5/2007 |
| JP | 2007115835 A * | 5/2007 |
| JP | 2008-20065 | 1/2008 |
| JP | 2008-208885 | 9/2008 |
| JP | 2008208885 A * | 9/2008 |
| JP | 2008-295906 | 12/2008 |
| JP | 2009-095532 | 5/2009 |
| WO | WO 99/22162 | 5/1999 |

OTHER PUBLICATIONS

International Search Report in PCT/JP2010/072240 issued Mar. 8, 2011.
Japanese Office Action issued in JP 2010-186109 mailed May 8, 2012.
English Language Translation of Japanese Office Action issued in JP 2010-186109 mailed May 8, 2012.
English Language Abstract of JP 08-021482 published Jan. 23, 1996.
English Language Translation of JP 08-021482 published Jan. 23, 1996.
English Language Abstract of JP 2006-057766 published Mar. 2, 2006.
English Language Transaltion of JP 2006-057766 published Mar. 2, 2006.
English Language Abstract of JP 2007-115835 published on May 10, 2007.
English Language Translation of JP 2007-115835 published on May 10, 2007.
English Language Abstract of JP 2008-020065 published Jan. 31, 2008.
English Language Translation of JP 2008-020065 published Jan. 31, 2008.
English Language Abstract of JP 2008-295906 published Dec. 11, 2008.
English Language Translation of JP 2008-295906 published Dec. 11, 2008.
English Language Abstract of JP 2002-502942 published Jan. 29, 2002.
English Language Translation of JP 2002-502942 published Jan. 29, 2002.
English Language Abstract of JP 8-019687 published Jan. 23, 1996.
English Language Translation of JP 8-019687 published Jan. 23, 1996.
International Search Report issued in PCT/JP2010/072241 on Apr. 5, 2011.
English Language Abstract of JP 2009-095532 published May 7, 2009.
English Language Translation of JP 2009-095532 published May 7, 2009.
International Search Report issued in PCT/JP2011/050539 on Mar. 8, 2011.
English Language Abstract of JP 2005-502850 published Jan. 27, 2005.
English Language Translation of JP 2005-502850 published Jan. 27, 2005.
Enalish Language Abstract of JP 63-125243 published Aug. 16, 1988.
U.S. Appl. No. 13/660,696.
English Language Abstract of CN 101709761 published May 19, 2010.
English Language Abstract of JP 10-214715 published Aug. 11, 1998.
English Language Translation of JP 10-214715 published Aug. 11, 1998.
English Language Abstract of JP 2008-208885 published Sep. 11, 2008.
English Language Translation of JP 2008-208885 published Sep. 11, 2008.
Japanese Office Action issued in JP 2010-038631 dated May 21, 2013.
English Language Translation of Japanese Office Action issued in JP 2010-038631 dated May 21, 2013.
Korean Office Action issued in KR10-2012-7016693 issued on Sep. 24, 2013.
English Language Translation of Korean Office Action issued in KR10-2012-7016693 issued on Sep. 24, 2013.
Initial Examination Report issued in TW 100101708 on Oct. 17, 2013.
English Language Translation of Initial Examination Report issued in TW 100101708 on Oct. 17, 2013.
English Language Abstract and Translation of JP 2006-230591 published on Sep. 7, 2006.
English Language Abstract and Translation of JP2006-029585 published on Feb. 2, 2006.
Korean Office Action issued in KR 2012-7030456 on Dec. 26, 2013.
English Language Translation of Korean Office Action issued in KR 2012-7030456 on Dec. 26, 2013.
Korean Office Action issued in KR 10-2012-7028098 on Dec. 12, 2013.
English Language Translation of Korean Office Action issued in KR 10-2012-7028098 on Dec. 12, 2013.
U.S. Appl. No. 13/681,566.

* cited by examiner

DAMPER, WASHING MACHINE, AND WASHER/DRYER

CROSS-REFERENCE TO RELATED APPLICATION(S)

This application is a continuation to an International Application No. PCT/JP2010/072240, filed on Dec. 10, 2010 which is based upon and claims the benefit of priority from Japanese Patent Applications No. 2010-038631 filed on Feb. 24, 2010, Japanese Patent Applications No. 2010-127523 filed on Jun. 3, 2010, and Japanese Patent Applications No. 2010-186109 filed on Aug. 23, 2010 the entire contents of which are incorporated herein by reference.

FIELD

Embodiments disclosed herein generally relate to a damper utilizing a magnetic viscous fluid also referred to as a magnetorheological fluid or MR fluid, a washer, and a washer dryer.

BACKGROUND

Drum washers have been typically configured by an exterior housing containing a tub which further contains a drum being driven in rotation by a motor provided outside the tub. The tub is disposed above the bottom panel of the exterior housing through an elastic support of a suspension which is provided with a damper configured to reduce the oscillation of the tub caused by the oscillation of the drum.

FIG. 29 shows one example of a damper primarily configured by cylinder 1 and shaft 2 inserted into cylinder 1. Cylinder 1 is connected to the tub not shown by connecting member 3 provided on its upper end, whereas shaft 2 is connected to the bottom panel not shown of the exterior housing by connecting portion 2a provided on its lower end.

Cylinder 1 is cylindrical in form and contains coil 4 being stored in bobbin 5 and coil 4 is disposed so as to surround shaft 2. Inside cylinder 1, ring-shaped yokes 6 and 7 made of magnetic material are disposed on both axial or upper and lower ends of coil 4. Magnetic circuit M is established between yokes 6 and 7, shaft 2, and cylinder 1. More specifically, magnetic circuit M defines a closed circuit of magnetic flux path which is generated by the conduction of coil 4 and configured by shaft 2—upper yoke 6—cylinder 1—lower yoke 7—shaft 2.

Between upper yoke 6 and 7, coil 4, and shaft 2, magnetic viscous fluid also referred to as MR fluid is filled. Magnetic viscous fluid 8, when subjected to magnetic field, varies its viscosity depending on the strength of the magnetic field and comprises, for example, a mixture of ferromagnetic particles such as iron and carbonyl iron dispersed in oil. Application of magnetic field causes the ferromagnetic particles to form a chain of clusters that results in an increase in viscosity.

Inside cylinder 1, seal 9 is disposed axially outward of or below lower yoke 7. Seal 9 prevents leakage of magnetic viscous fluid 8 from the space provided between yokes 6 and 7, coil 4, and shaft 2 which is also referred to as magnetic viscous fluid filling portion 10.

Cylinder 1 further contains lower bearing 11 disposed axially outward of or below seal 9 and upper bearing 11 disposed axially outward of or above upper yoke 6. These bearings 11 and 12 support shaft 2 to allow relative reciprocating movement in the axial direction.

Further inside cylinder 1, reserved space 13 is provided above upper bearing 12. A predetermined amount of magnetic viscous fluid 8 is stored in this reserved space 13 while also filling the space between reserved space 13 and magnetic viscous fluid filling portion 10. The upper end of shaft 2 is located within reserved space 13 and thus, is placed in contact with magnetic viscous fluid 8.

Damper 14 is configured as described above.

Immediately above connecting portion 2a of shaft 2 located below and outside cylinder 1, spring receiving plate 15 is attached. Between spring receiving plate 15 and lower bearing 11, spring (compression coil spring) 16 is provided which is capable of expanding and contracting. Suspension 17 is configured in the above described manner and provides elastic support to the water tub.

When the operation of a drum washer configured as described above is started, the rotation of the drum containing laundry oscillates the tub mostly in the up and down direction. In response to the up and down oscillation of the tub, cylinder 1 constituting suspension 17 and being connected to the tub, oscillates up and down around shaft 2 with extension/contraction of spring 16 along with upper bearing 12, upper yoke 6, coil 4, lower yoke 7, seal 9, and lower bearing 11.

When cylinder 1 oscillates up and down around shaft 2 along with the above described components, magnetic viscous fluid 8 filled between shaft 2, yoke 6 and 7, and coil 4 exerts damping force through frictional resistance imparted by the viscosity to reduce the degree of oscillation of the tub.

The conduction of coil 4 further generates magnetic circuit M which significantly increases the viscosity of magnetic viscous fluid 8 residing in the path of magnetic flux which includes, in particular, the space between shaft 2 having relatively high magnetic flux density and upper yoke 6, as well as the space between lower yoke 7 and shaft 2, thereby increasing the imparted frictional resistance. The damping force is thus increased by the increase in the frictional resistance during the up and down oscillation of cylinder 1 oscillating along with the above described components, especially coil 4, upper yoke 6, and lower yoke 7.

Coil 4 is configured to control the viscosity of magnetic viscous fluid 8 by generating a magnetic field corresponding to the level of the flowing current, meaning that the generated magnetic field varies with the level of current to variably control the viscosity of magnetic viscous fluid 8.

In another typical related example, the damper is configured to obtain a certain damping force by suppressing the flow of the magnetic viscous fluid caused by the relative movement of the cylinder and the shaft, and thus, produces the damping force in a different way as compared to the above described damper in which the damping force is imparted by the frictional resistance originating from the viscosity of magnetic viscous fluid 8 filled in the magnetic viscous fluid filling portion 10 when cylinder 1 and shaft 2 are relatively oscillated in the up and down direction.

In the related example shown in FIG. 29, seal 9 that prevents leakage of magnetic viscous fluid 8 from magnetic viscous fluid filling portion 10 is provided only on the lower side of cylinder 1, and the upper side of cylinder 1 stores magnetic viscous fluid 8 in reserved space 13. As a result, even when magnetic viscous fluid 8 leaks into reserved space 13 through the space between upper bearing 12 and shaft 2 from magnetic viscous fluid filling portion 10 due to heat expansion and oscillation, etc., magnetic viscous fluid 8 will go back to magnetic viscous fluid filling portion 10 from reserved space 13 when the temperature drops. Thus, it has been presumed that the density of magnetic viscous fluid 8 of magnetic viscous fluid filling portion 10 is maintained and therefore, no degradation occurred in the damping force.

However, as magnetic viscous fluid 8 deteriorates, its viscosity becomes greater and transforms into a margarine like state. Magnetic viscous fluid 8, when increased in viscosity, sticks onto the inner wall of reserved space 13 and stays there as shown in the double dot chain line in FIG. 6 when it leaks into reserved space 13. This will not allow the space between upper bearing 12 and shaft 2 to be sealed with magnetic viscous fluid 8 and as expansion and contraction of magnetic viscous fluid 8 is repeated in such state, air within reserved space 13 is introduced into magnetic viscous fluid filling portion 10 from the space between upper bearing 12 and shaft 2, thereby reducing the density of magnetic viscous fluid 8 within magnetic viscous fluid filling portion 10 and consequently degrading the damping force.

BRIEF DESCRIPTIONS OF THE DRAWINGS

Figure 1:
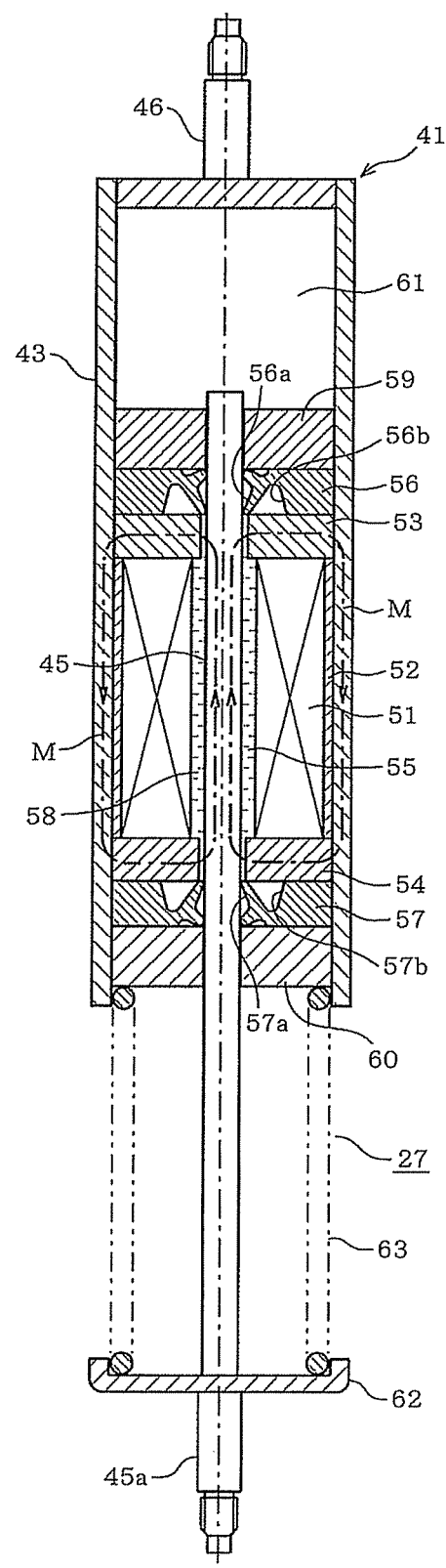
FIG. 1 is a front view of the main portions of a first embodiment.
Figure 4:
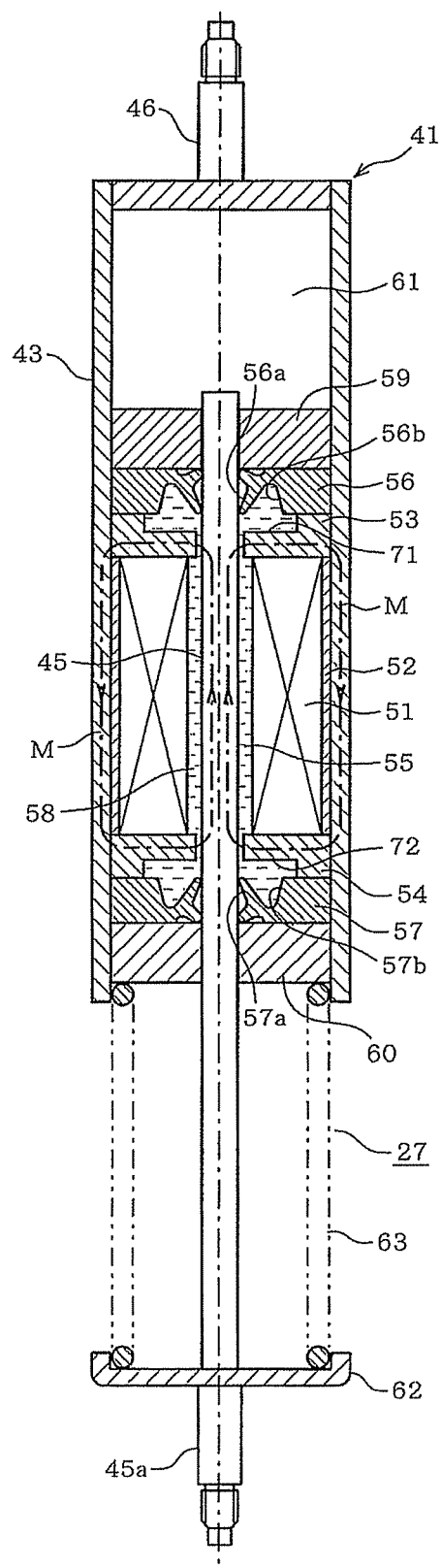

FIG. 4 corresponds to FIG. 1 and illustrates a second embodiment.

Figure 3:
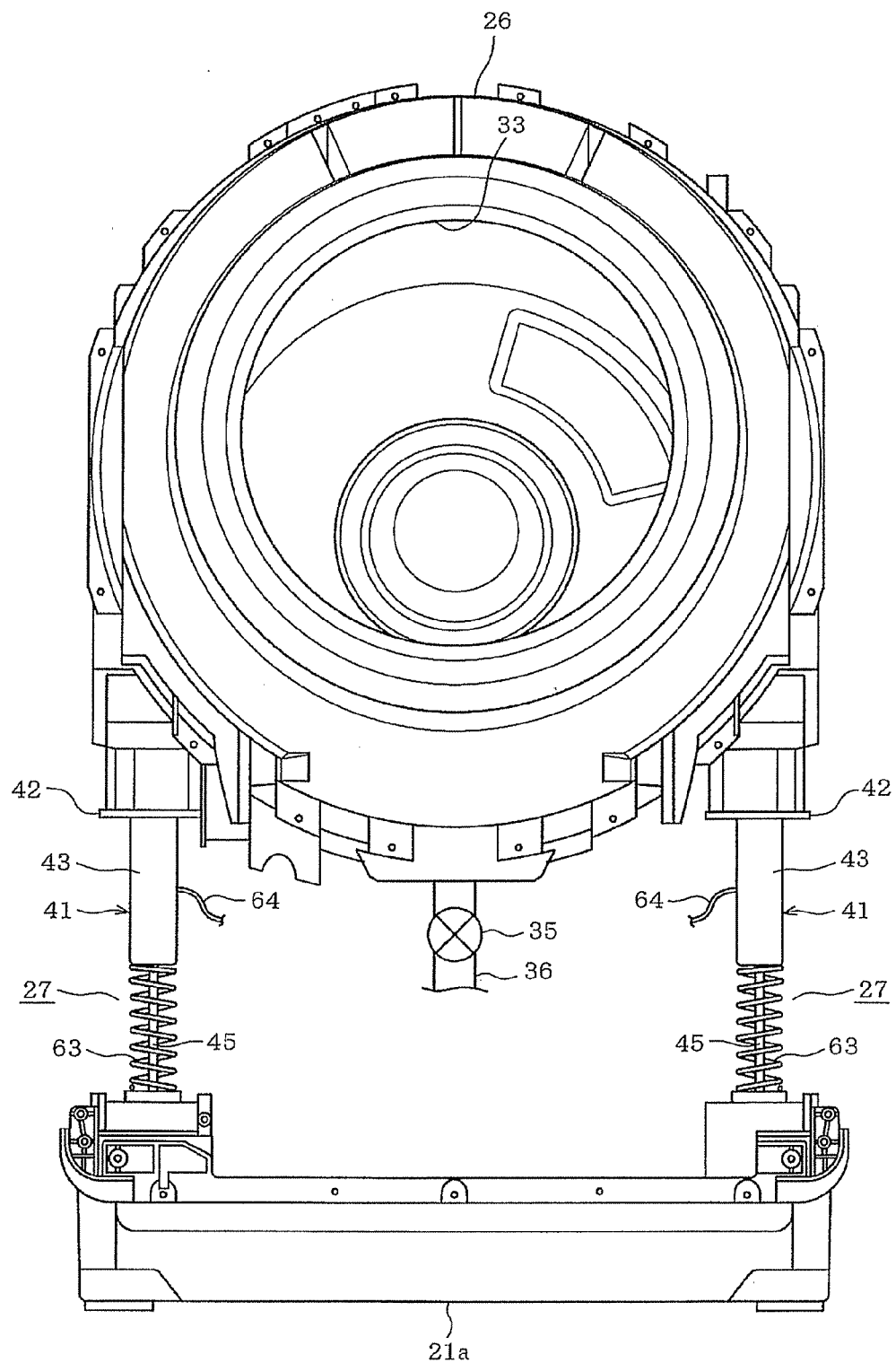
FIG. 3 is a front view of the internal structure of the drum washer dryer.
Figure 5:
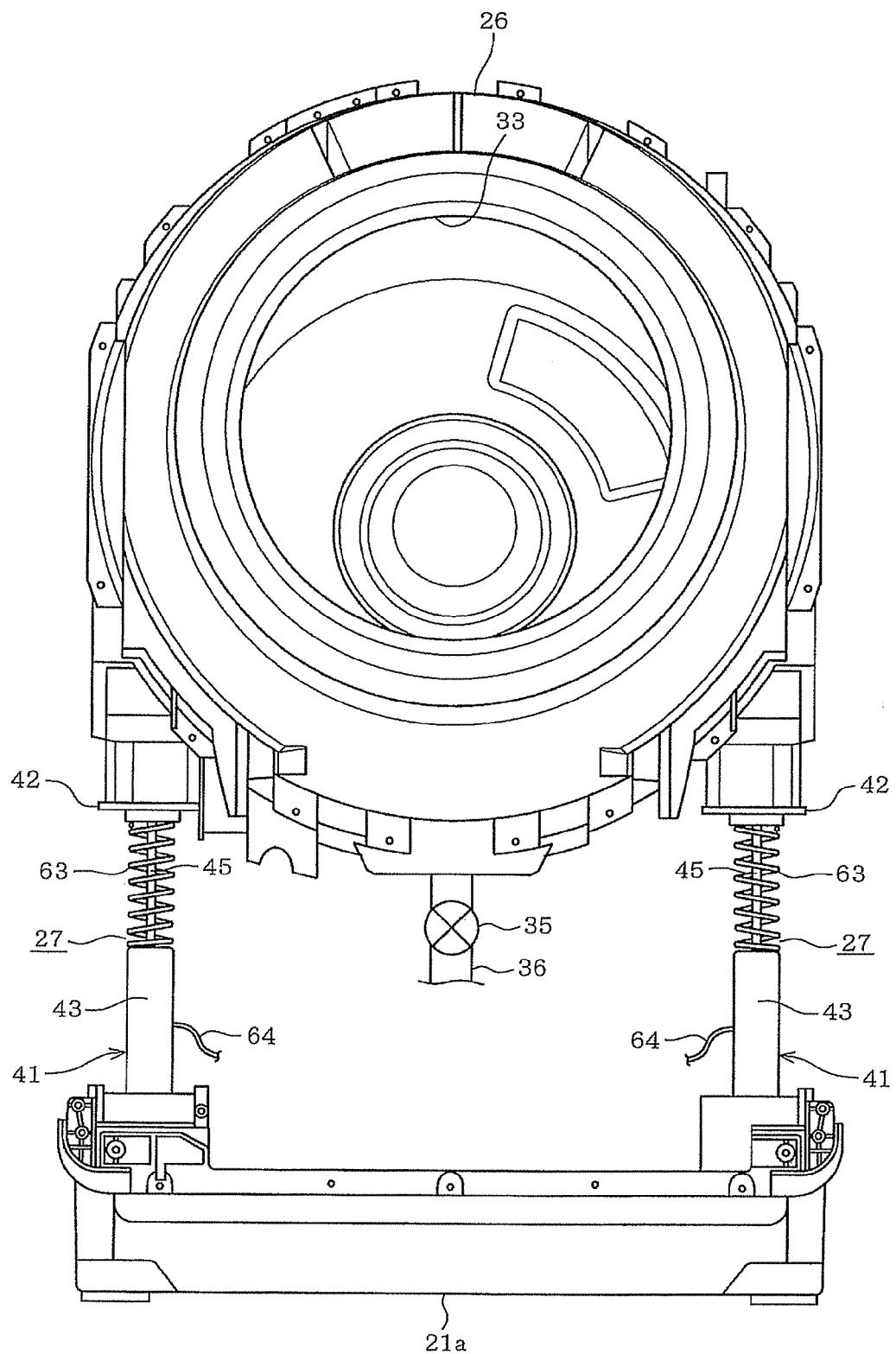

FIG. 5 corresponds to FIG. 3 and illustrates a third embodiment.

Figure 6:
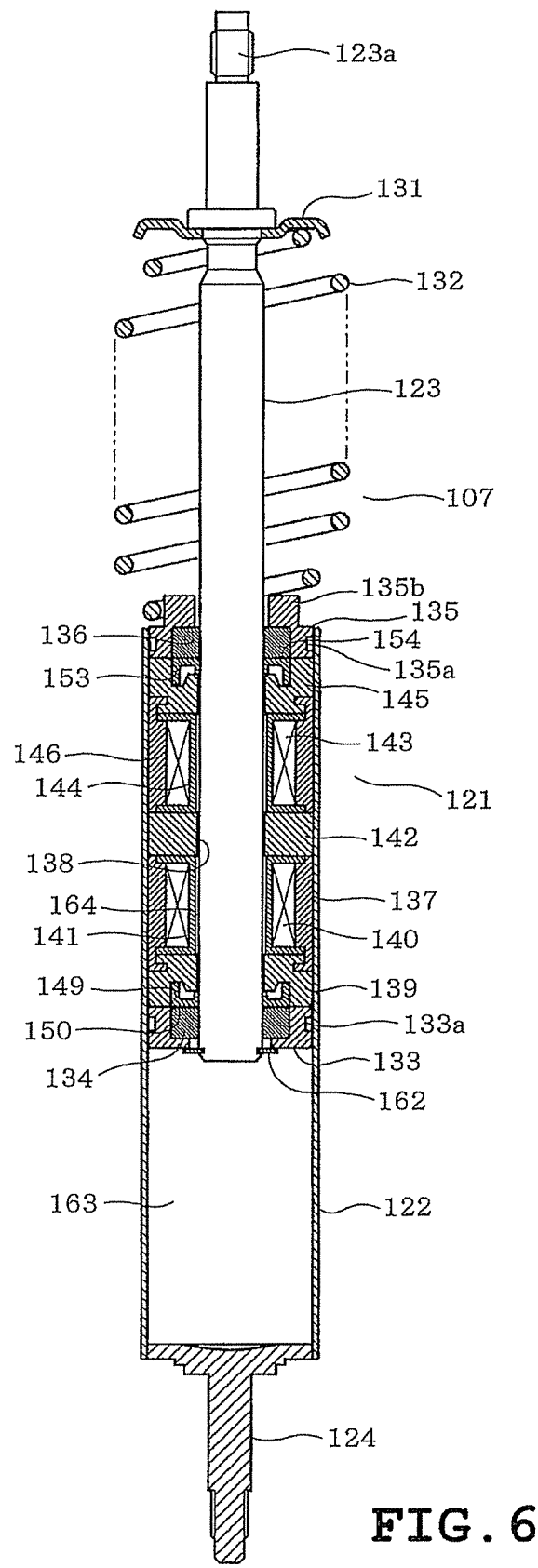

FIG. 6 corresponds to FIG. 1 and illustrates a fourth embodiment.

Figure 2:
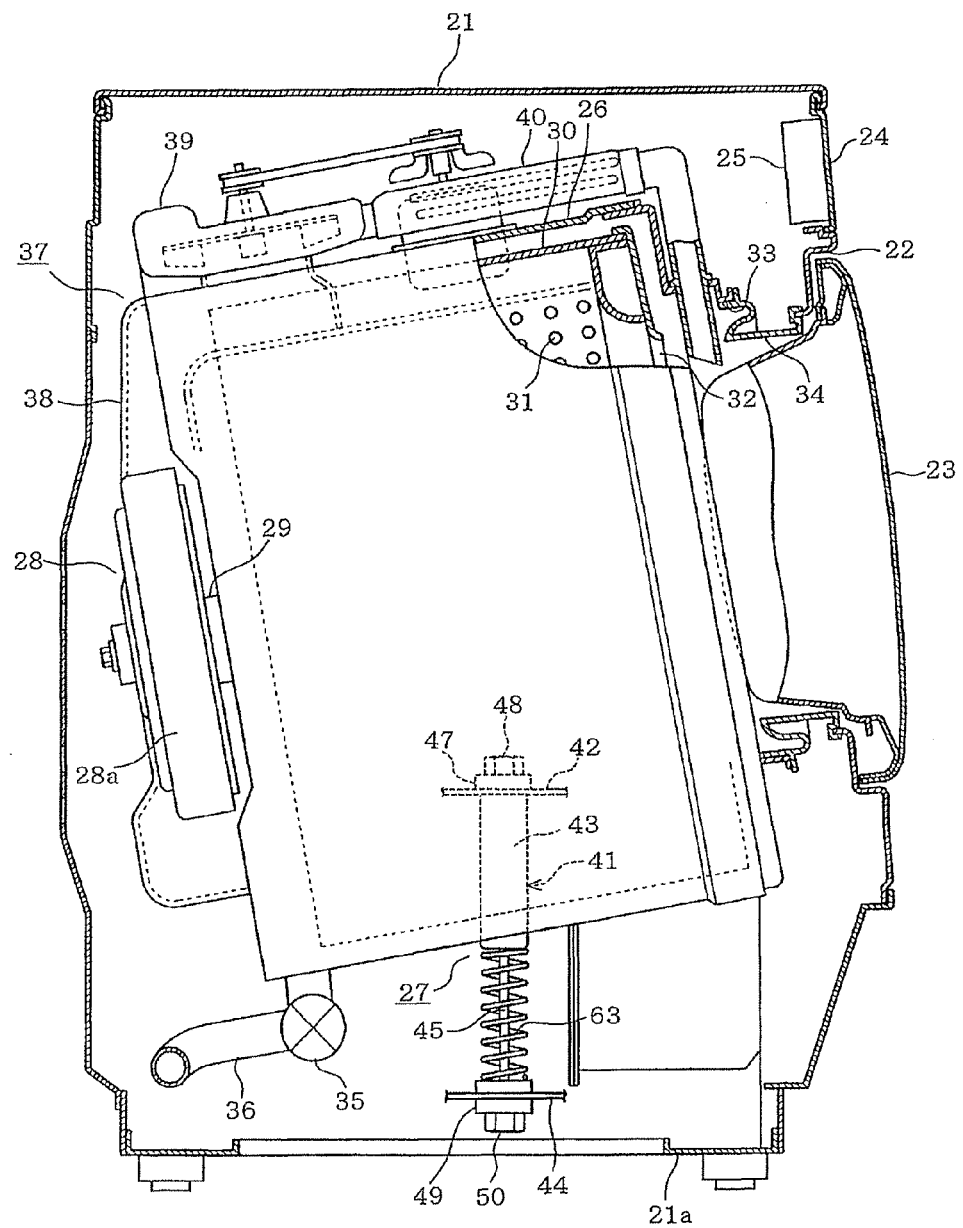
FIG. 2 is a partially broken vertical cross sectional view of the entire drum washer dryer.
Figure 7:
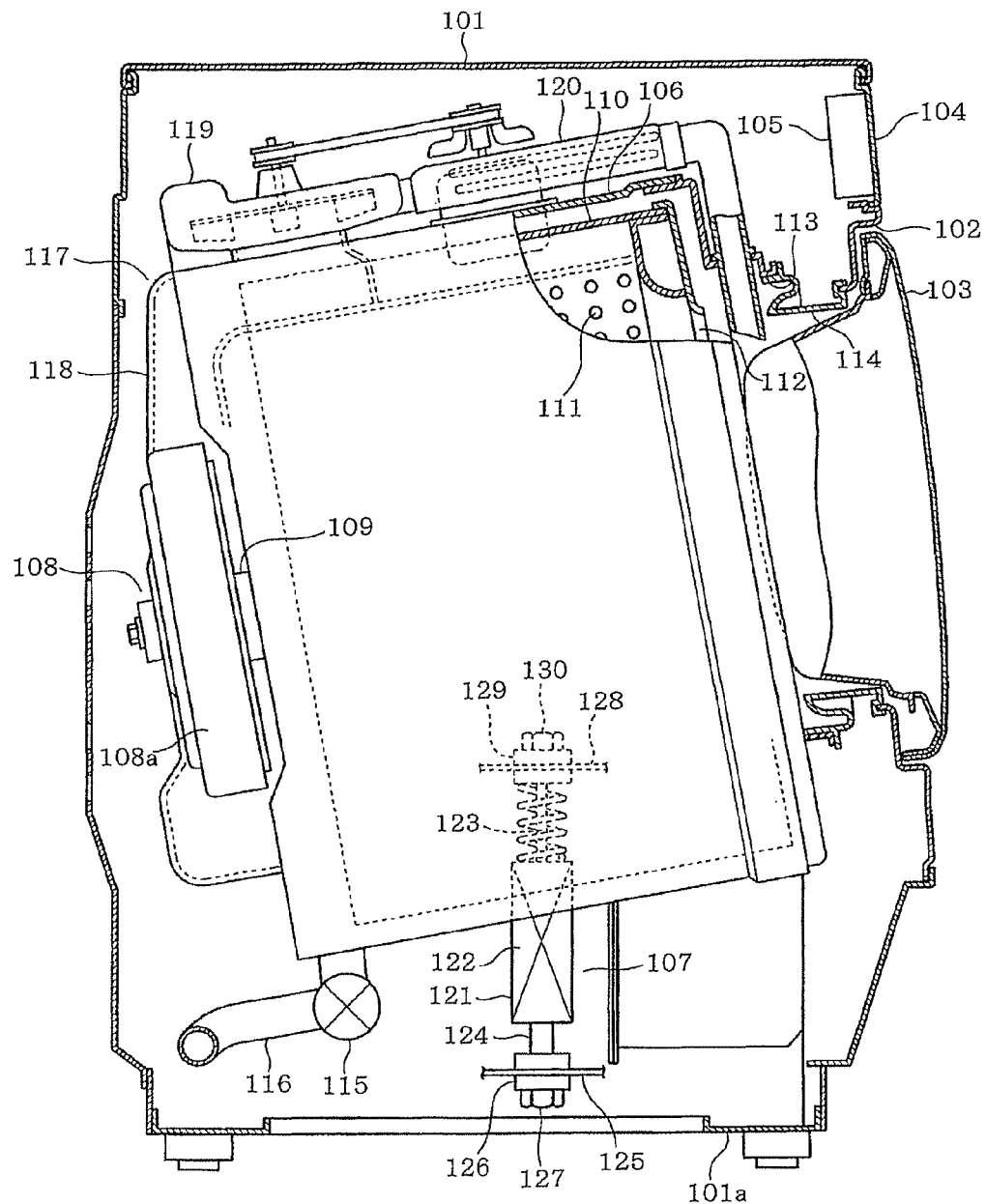

FIG. 7 corresponds to FIG. 2.

Figure 8:
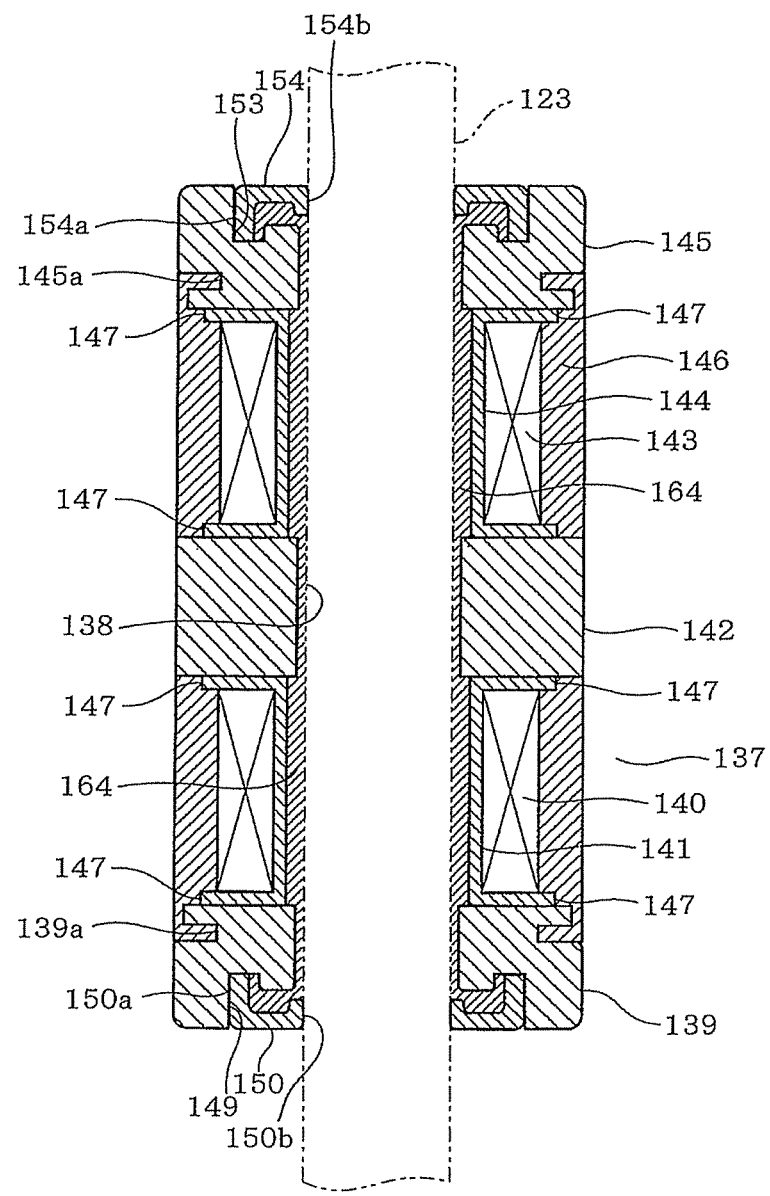

FIG. 8 is a vertical cross sectional view of a coil assembly.

Figure 9:
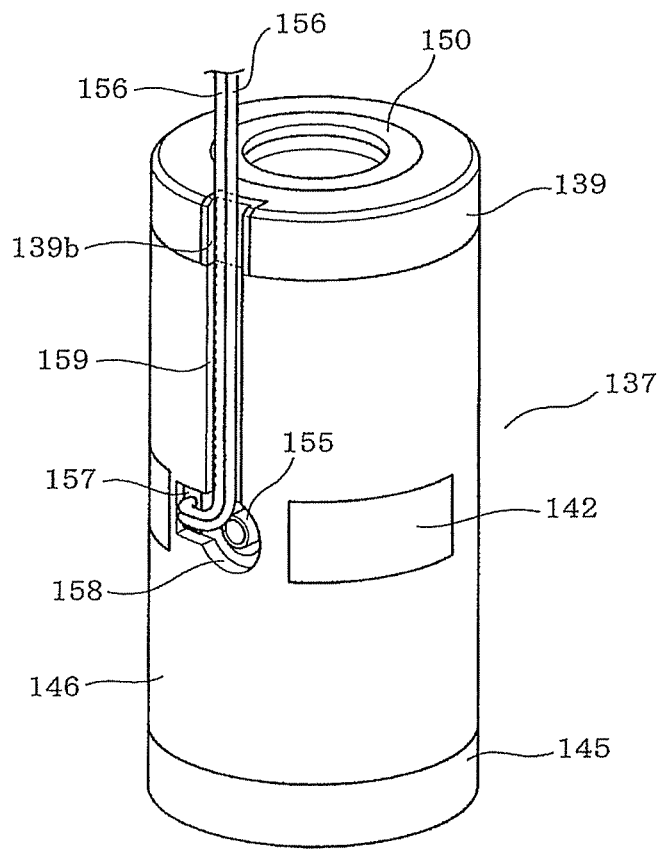

FIG. 9 is a perspective view of the coil assembly.

Figure 10:
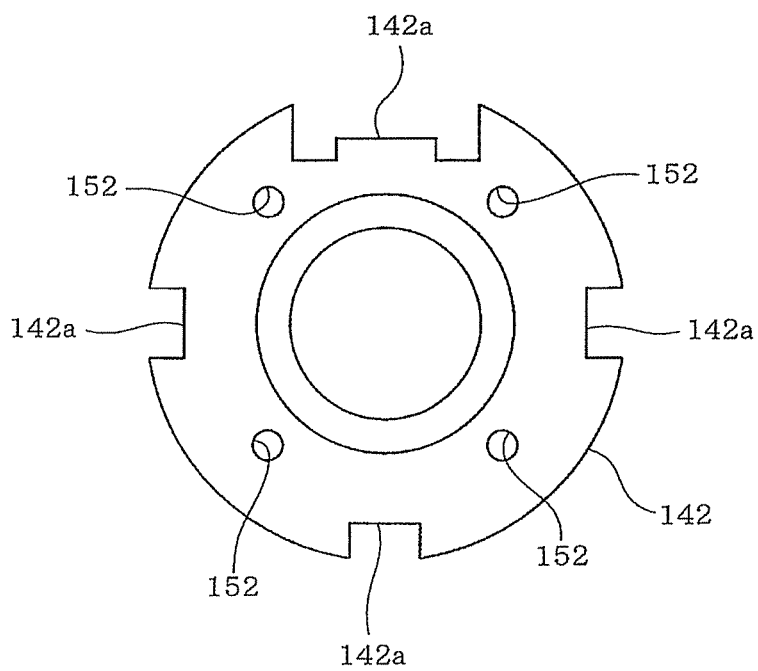

FIG. 10 is a side view of a second yoke.

Figure 11:
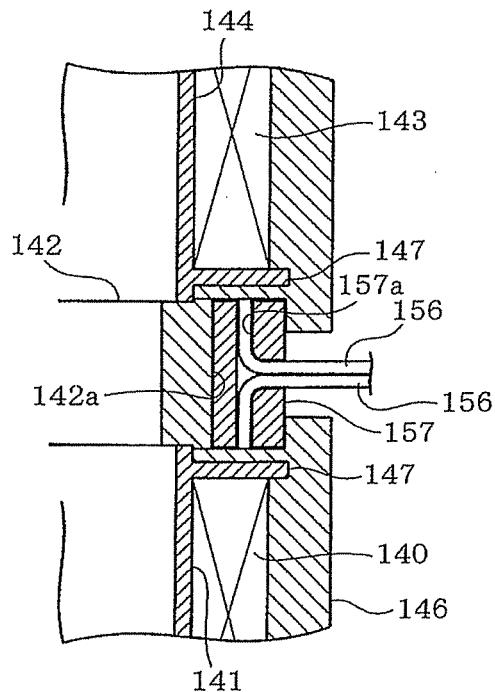

FIG. 11 is a partial vertical cross sectional view of a portion of the coil assembly where a lead wire is drawn out.

Figure 12:
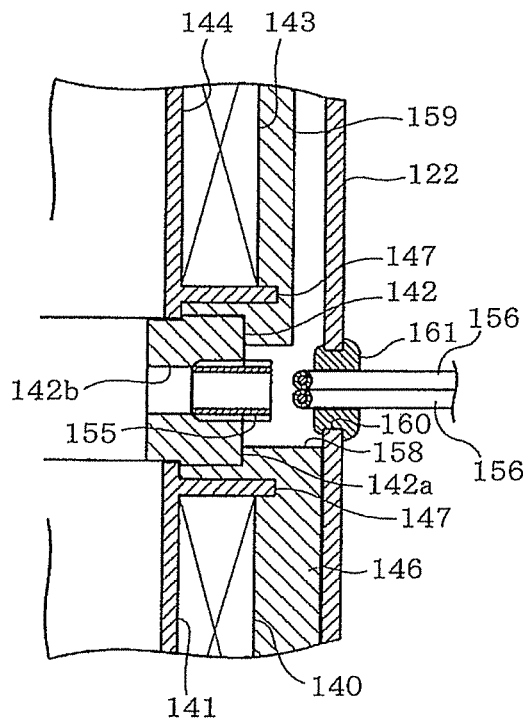

FIG. 12 is a partial vertical cross sectional view of a portion of the coil assembly where a lead wire is drawn out with the coil assembly being stored in a cylinder.

Figure 13:
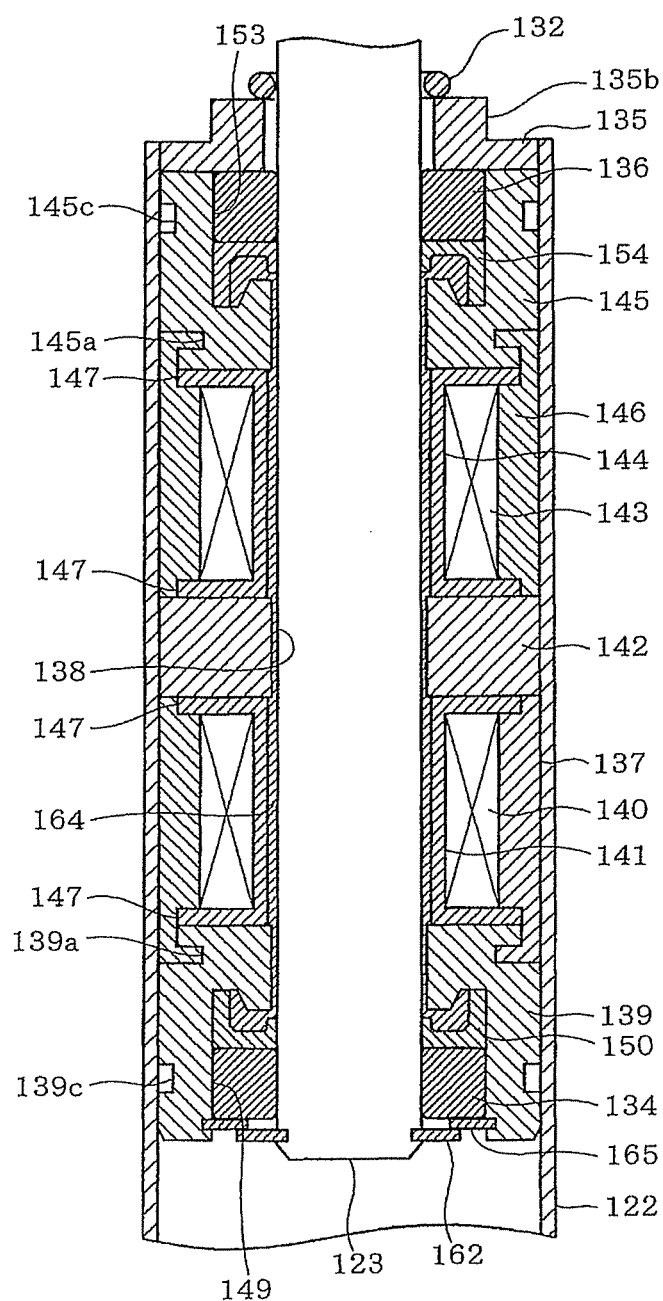

FIG. 13 is a partial cross sectional view of a damper of a fifth embodiment.

Figure 14:
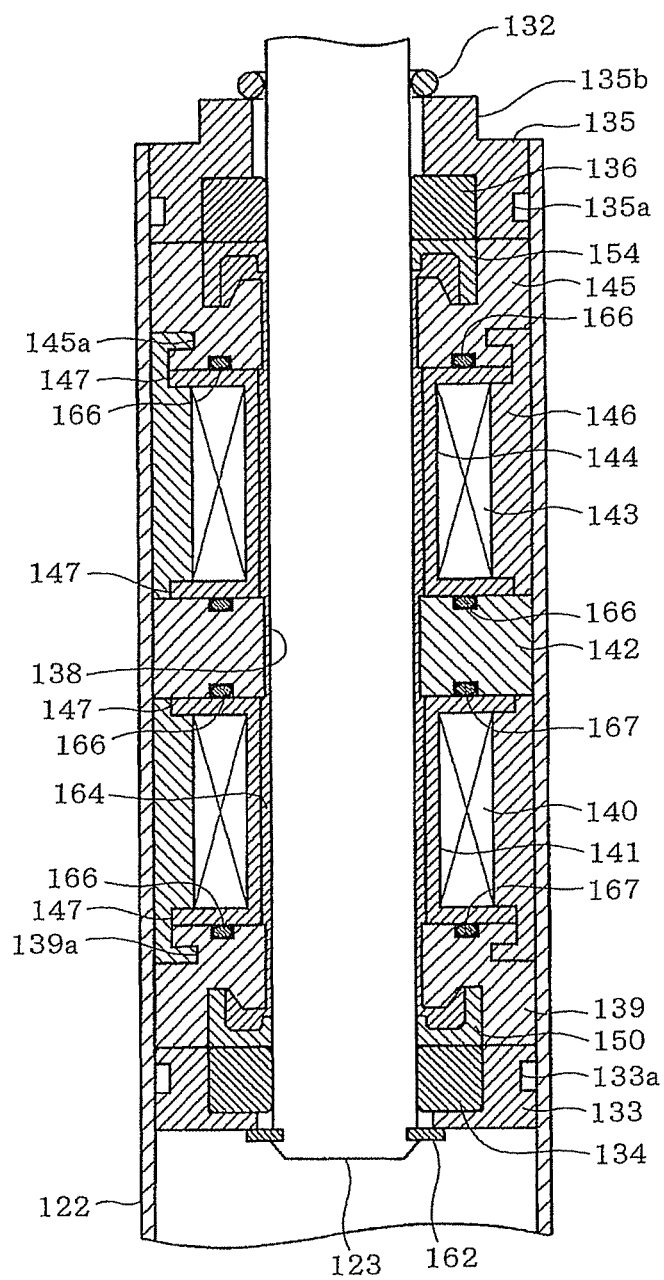

FIG. 14 corresponds to FIG. 13 and illustrates a sixth embodiment.

Figure 15:
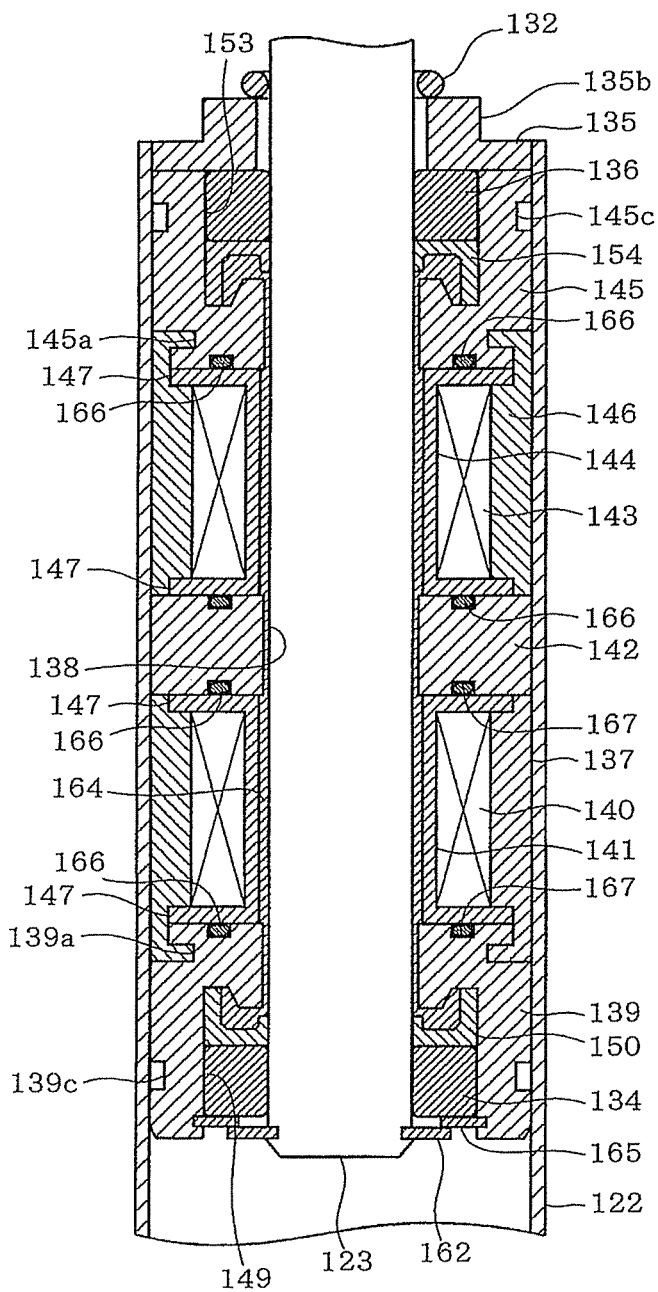

FIG. 15 corresponds to FIG. 13 and illustrates a seventh embodiment.

Figure 16:
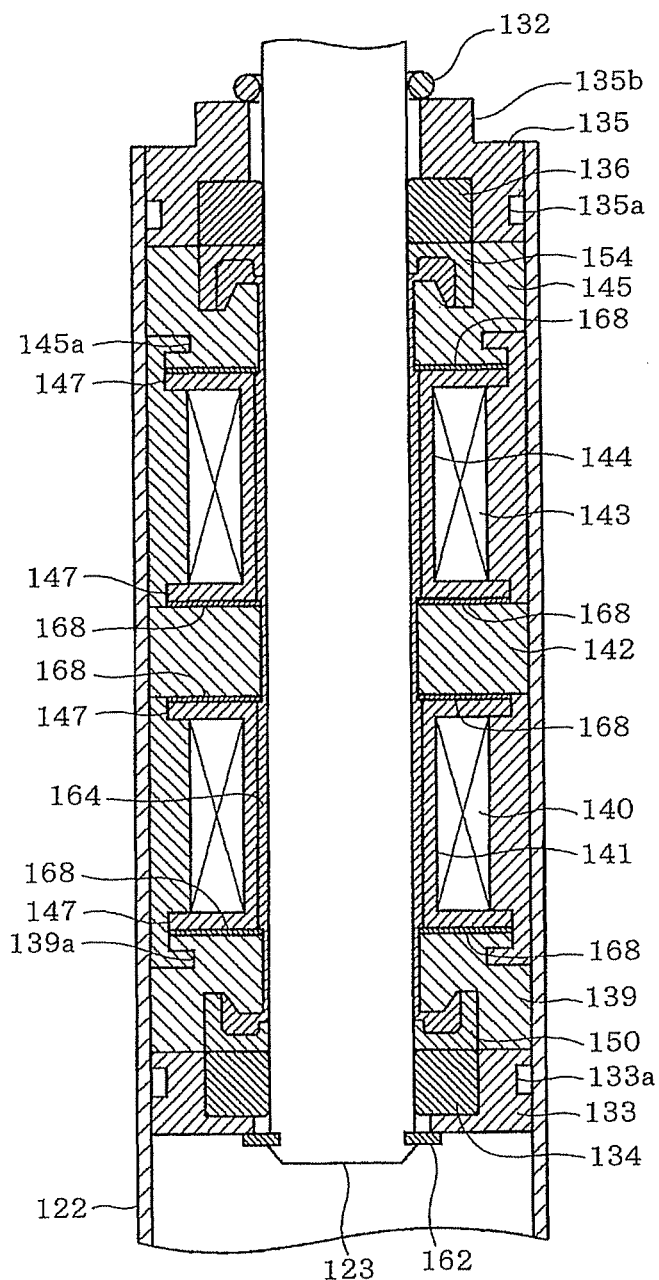

FIG. 16 corresponds to FIG. 13 and illustrates an eighth embodiment.

Figure 17:
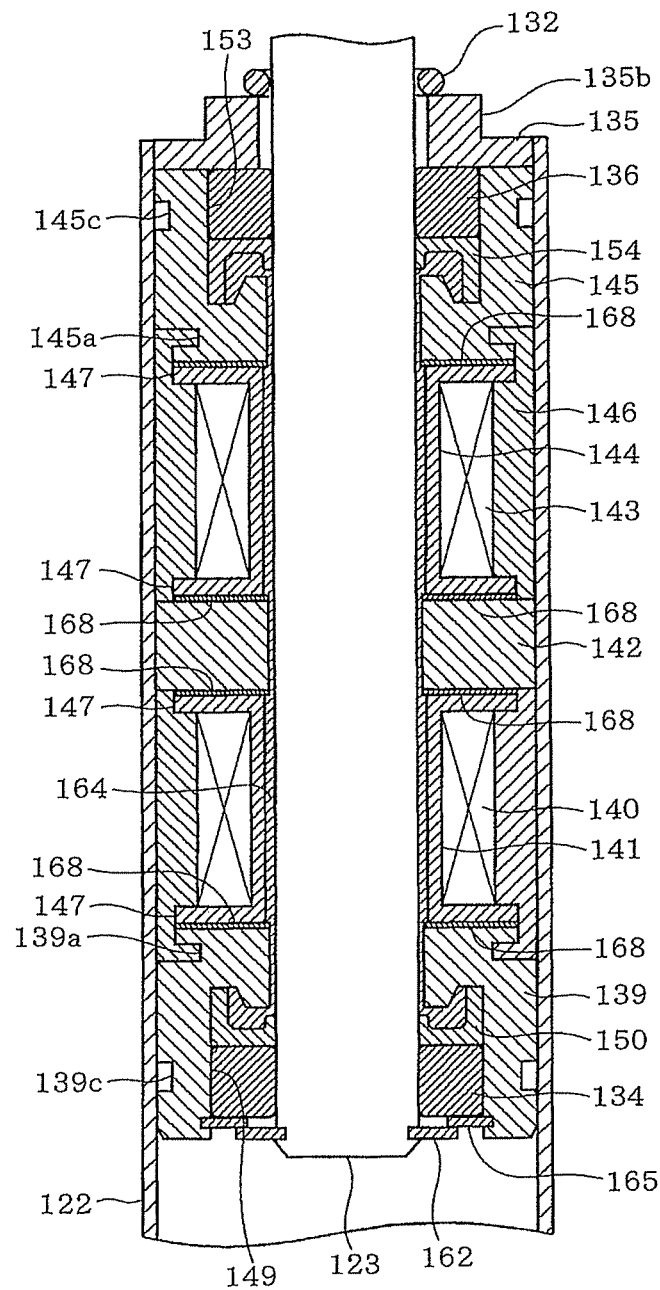

FIG. 17 corresponds to FIG. 13 and illustrates a ninth embodiment.

Figure 18:
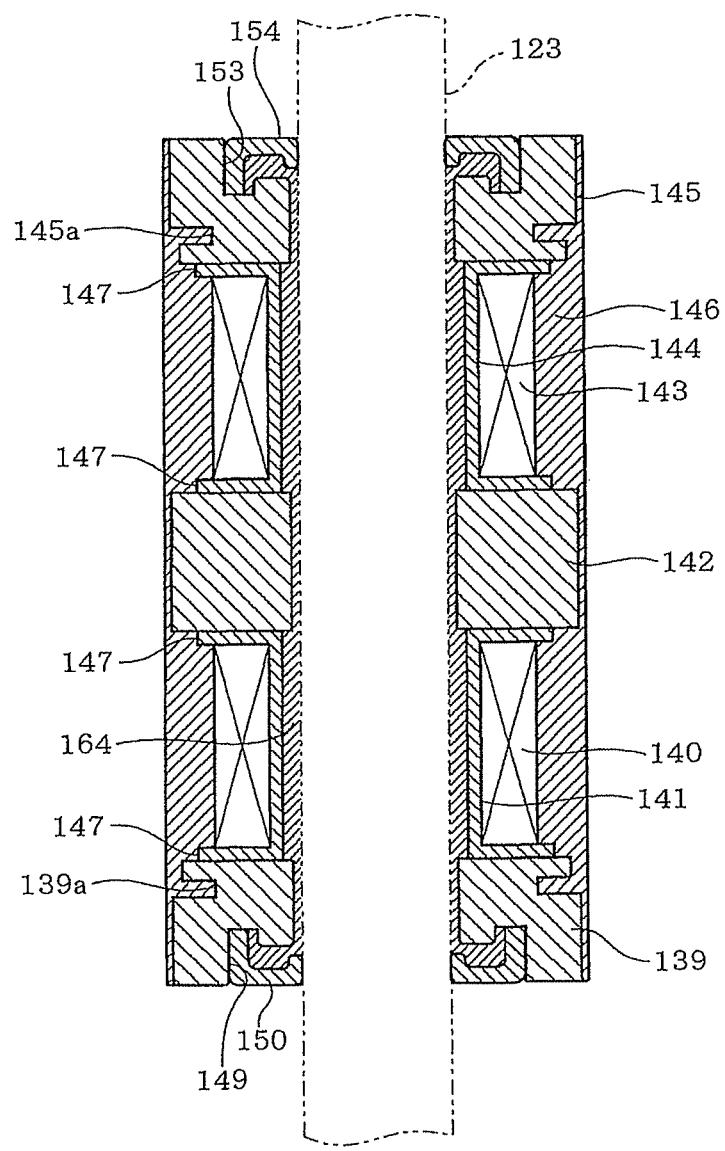

FIG. 18 corresponds to FIG. 18 and illustrates a tenth embodiment.

Figure 19:
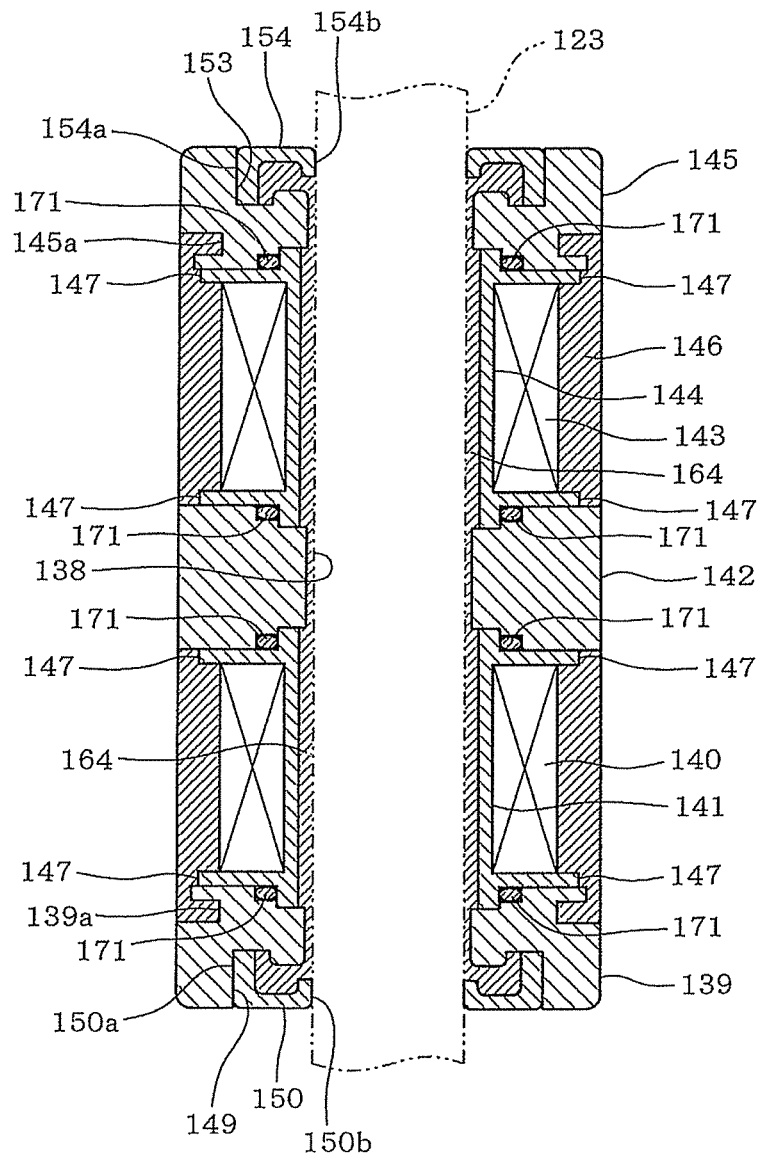

FIG. 19 corresponds to FIG. 8 and illustrates an eleventh embodiment.

Figure 20:
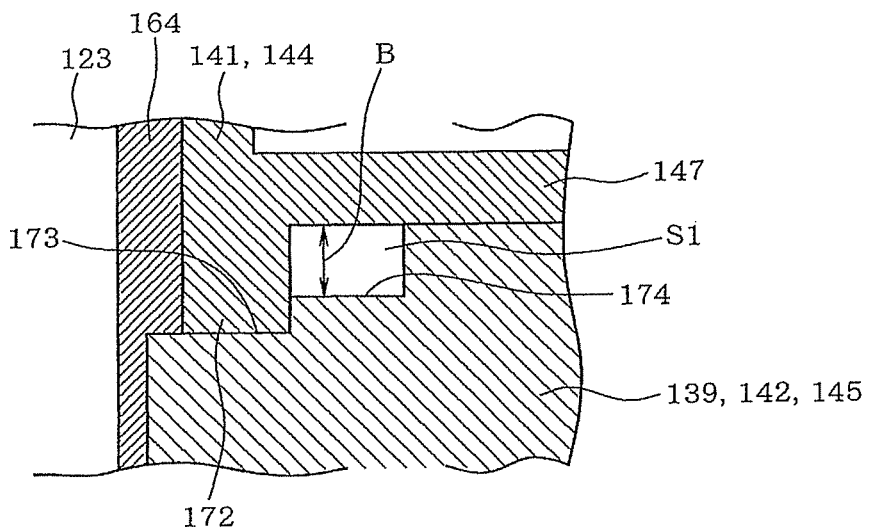

FIG. 20 a vertical cross sectional view illustrating a peripheral structure of an annular receiving portion without an O-ring.

Figure 21:
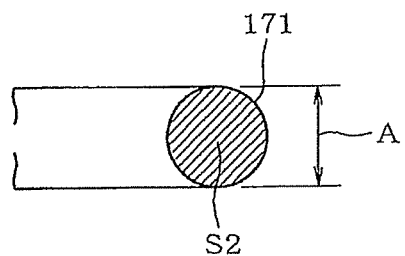

FIG. 21 is a cross sectional view of the O-ring.

Figure 22:
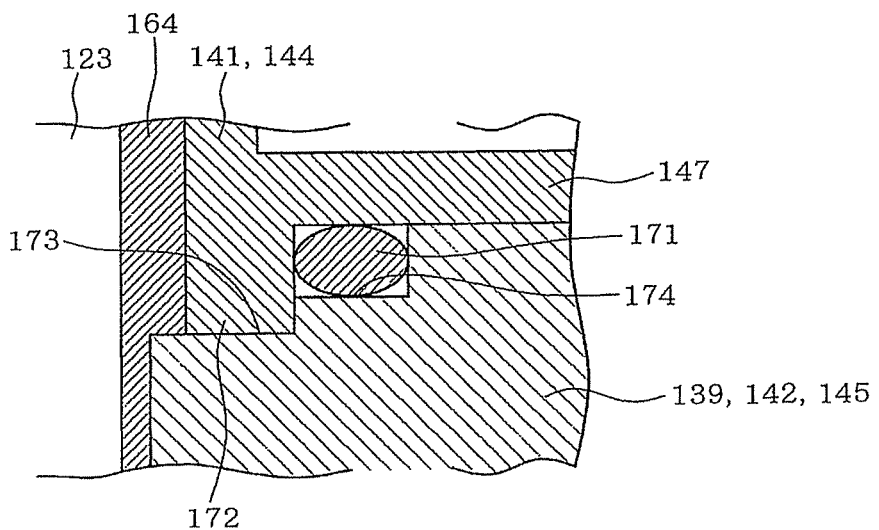

FIG. 22 corresponds to FIG. 20 and illustrates the annular receiving portion.

Figure 23:
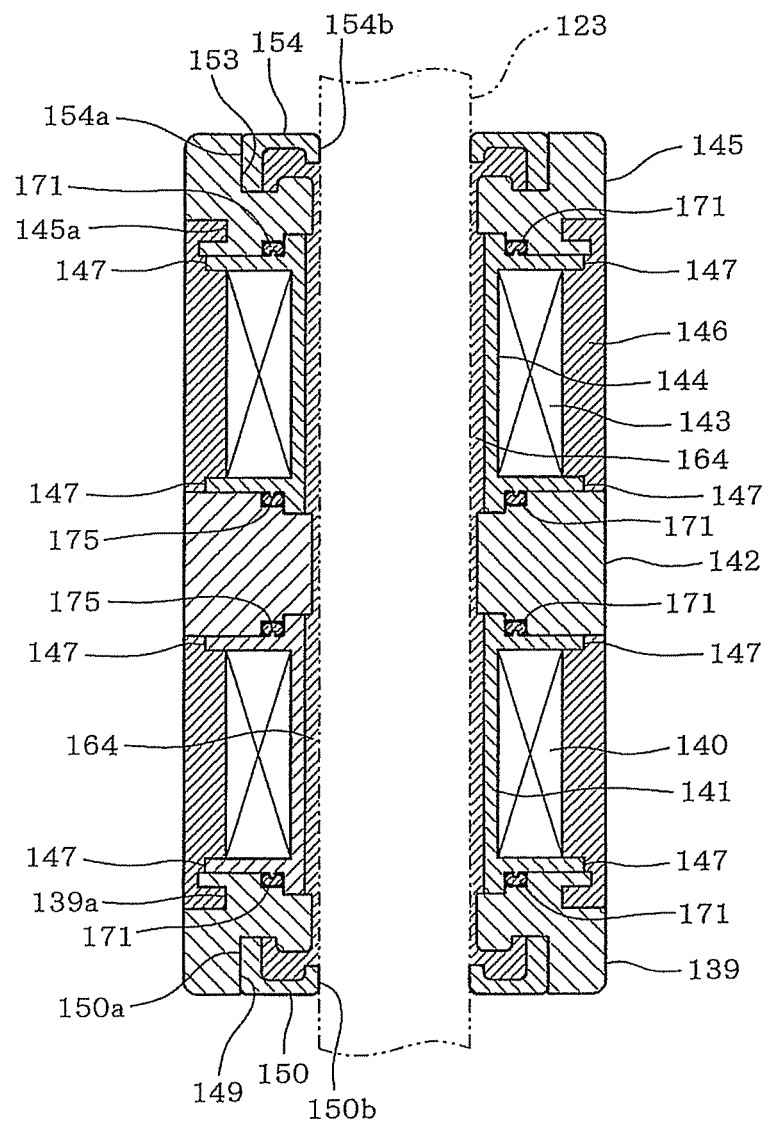

FIG. 23 corresponds to FIG. 8 and illustrates a twelfth embodiment.

Figure 24:
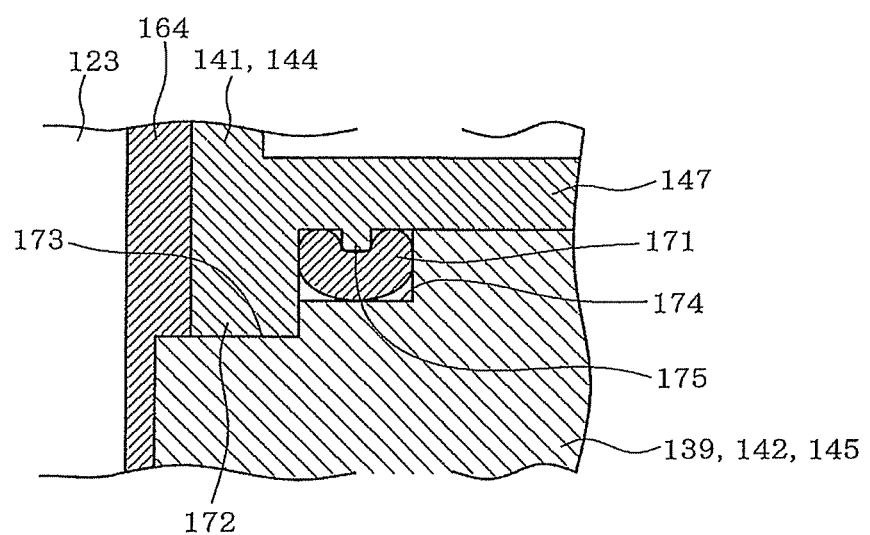

FIG. 24 corresponds to FIG. 22.

Figure 25:
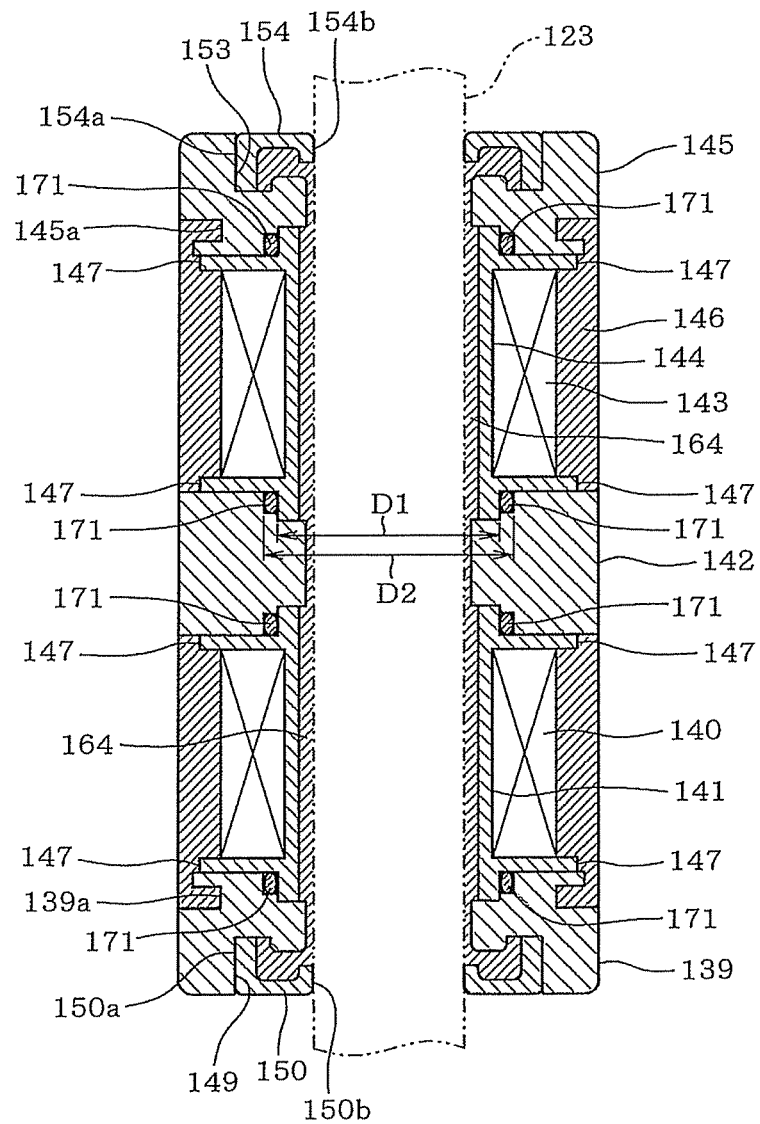

FIG. 25 corresponds to FIG. 8 and illustrates a thirteenth embodiment.

Figure 26:
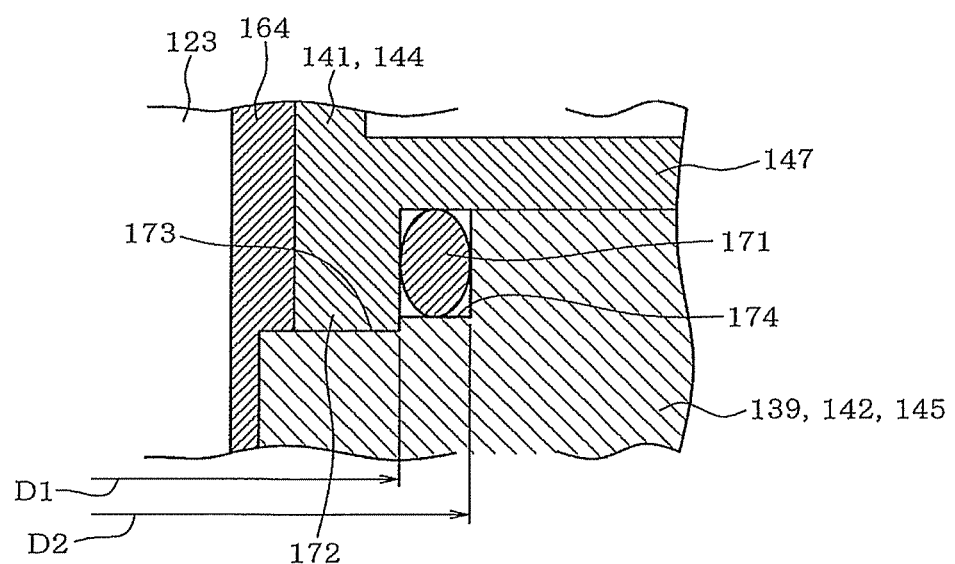

FIG. 26 corresponds to FIG. 22.

Figure 27:
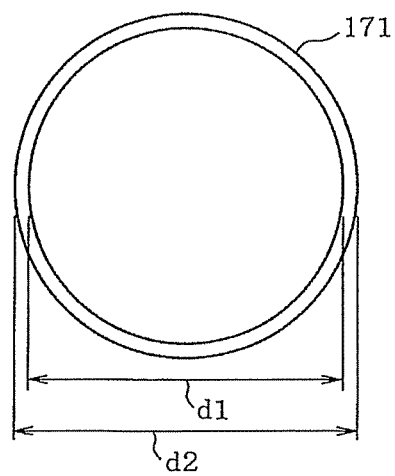

FIG. 27 is a front view of the O-ring.

Figure 28:
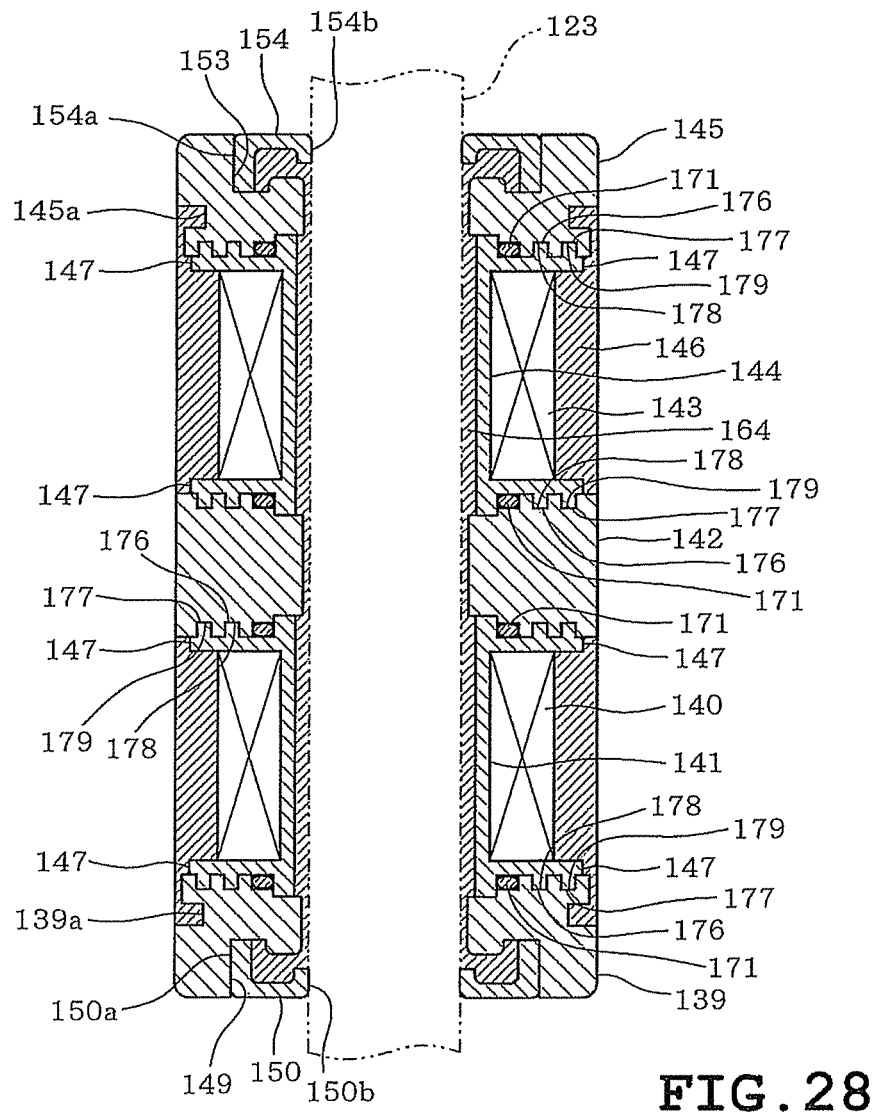

FIG. 28 corresponds to FIG. 8 and illustrates a fourteenth embodiment.

Figure 29:
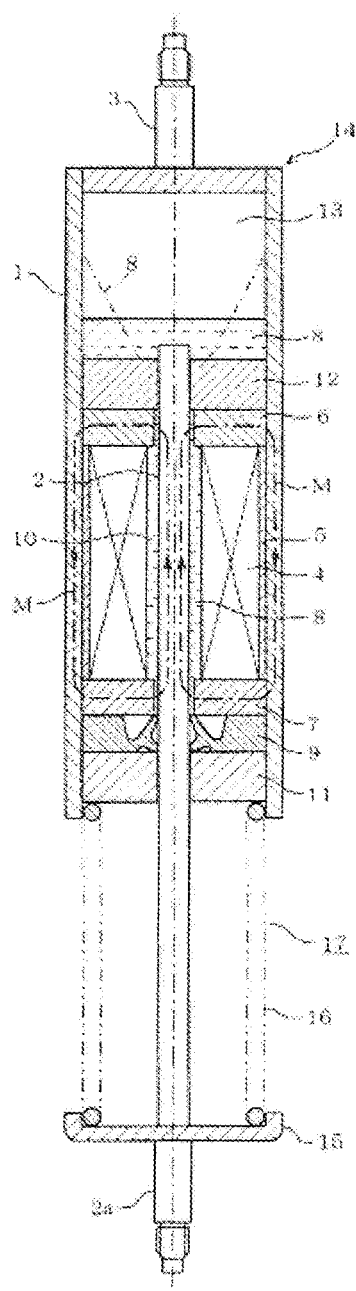

FIG. 29 corresponds to FIG. 1 and illustrates a related example.

DESCRIPTION

In one embodiment, a damper is disclosed. The damper includes a cylinder; a shaft inserted in the cylinder; a coil disposed inside the cylinder and surrounding the shaft; a yoke disposed inside the cylinder so as to be located at both axial ends of the coil and being configured to form a magnetic circuit with the shaft and the cylinder; and a magnetic viscous fluid filled between the yokes, the coil, and the shaft. A seal is disposed inside the cylinder so as to be located axially outside each of the yokes, the seal being configured to trap the magnetic viscous fluid between the yokes, the coil, and the shaft. A bearing is disposed axially outside each of the seals, the bearing being configured to support the shaft so as to be axially and relatively reciprocable.

A first embodiment will be described hereinafter with reference to FIGS. 1 to 3. Referring to FIG. 2 illustrating the entire structure of a drum washer dryer, exterior housing 21 serves as the outermost structure. Exterior housing 21 has laundry inlet/outlet 22 at the central portion of its front side (right side as viewed in FIG. 2) for loading and unloading of laundry which is opened/closed by door 23. On the upper front portion of exterior housing 21, control panel 24 is provided which has controller 25 for controlling the operation of the washer on its bottom side (inside exterior housing 21).

Exterior housing 21 contains water tub (tub) 26. Water tub 26 is configured as a laterally oriented cylinder with its axis extending in the front and rear direction which is oriented in the left and right direction as viewed in FIG. 2. Water tub 26 is elastically supported so as to be inclined forwardly upward by a pair of left and right suspensions 27 so as to be located above bottom panel 21a of exterior housing 21 as shown in FIG. 3. The structure of suspension 27 will be a later described in detail.

On the rear portion of water tub 26, motor 28 is attached is as shown in FIG. 2. Motor 28 comprises an outer rotor direct current brushless motor. A rotary shaft not shown attached to the central portion of rotor 28a is inserted into water tub 26 through bearing housing 29.

Water tub 26 contains drum (also referred to as rotary tub) 30. Drum 30 is provided coaxially with water tub 2 and is configured as a laterally oriented cylinder with its axis extending in the front and rear direction. The central rear portion of drum 30 is connected to the tip of the rotary shaft of motor 28 so as to be inclined forwardly upward. Drum 30 is driven in rotation by motor 28 and motor 28 serves as a drum driving unit that drives drum 30.

The peripheral portion or the waist of drum 30 is provided with multiplicity of pores 31. Exterior housing 21 and water tub 26 each has openings 32 and 33 respectively at their front sides and opening 33 of water tub 26 communicates with laundry inlet/outlet 22 through annular bellows 34. As a result, laundry inlet/outlet 22 communicates with drum 30 interior through bellows 34, opening 33 of water tub 26, and opening 32 of drum 30.

The bottom rear side portion of water tub 26 is connected to drain tube 36 by way of exhaust valve 35. Dry unit 37 is disposed along the rear side portion, the upper portion, and forward portion of water tub 26. Dry unit 37 comprises dehumidifier 38, blower (blower unit) 39, and heater (heating unit) 40, and dries the laundry by dehumidifying the air inside water tub 26, heating it, and returning the heated air back into water tub 26.

The structure of suspension 27 will be described in detail hereinafter. Suspension 27 is provided with damper 41 and this damper 41 comprises cylinder 43 mounted on mounting plate 42 provided on water tub 26 and shaft 45 mounted on mounting plate 44 provided at bottom panel 21a of exterior housing 21.

More specifically, connecting member 46 shown in FIG. 1 is provided on the upper end of cylinder 43. Connecting member 46, as shown in FIG. 2, is secured to mounting plate 42 of water tub 26 by nut 48 by way of resilient set plate 47 or the like to mount cylinder 43 on mounting plate 42 and consequently on water tub 26. On the other hand, the lower end of shaft 45 is provided with connecting portion 45a shown in FIG. 1. Connecting portion 45a, as shown in FIG. 2, is secured to mounting plate 44 of bottom panel 21a by nut 50 by way of resilient set plate 49 such as rubber to mount shaft 45 on mounting plate 44 and consequently on exterior housing 21.

Cylinder 43 is cylindrical in form and contains coil 51 being stored in (wound around) bobbin 52 and being disposed so as to surround shaft 45 as shown in FIG. 1. Inside cylinder 43, ring-shaped yokes 53 and 54 made of magnetic material are disposed on both axial or upper and lower ends of coil 51. Magnetic circuit M is established between shaft 45 and cylinder 43 by these yokes 53 and 54. More specifically, magnetic circuit M defines a closed circuit of magnetic flux path configured by shaft 45—upper yoke 53—cylinder 43—lower yoke 54—shaft 45 through the conduction of coil 4.

Between upper yoke 53 and 54, coil 51, and shaft 45, magnetic viscous fluid (MR fluid) 55 is filled. Magnetic viscous fluid 55, when subjected to magnetic filed, varies its viscosity depending on the strength of the magnetic field and comprises, for example, a mixture of ferromagnetic particles such as iron and carbonyl iron dispersed in oil. Application of magnetic field on magnetic viscous fluid 55 causes the ferromagnetic particles to form a chain of clusters that results in an increase in viscosity.

Inside cylinder 43, seals 56 and 57 are disposed axially outward of or above upper yoke 53 and axially outward of or below lower yoke 54. Seals 56 and 57 prevent leakage of magnetic viscous fluid 55 from the space (magnetic viscous fluid filling portion 58) provided between yokes 53 and 54, coil 51, and shaft 45. Seals 56 and 57 are provided with lips 56a and 57a which are configured to be pressed in intimate contact with shaft 45. Lips 56a and 57a are provided with grooves 56b and 57b on their outer sides, respectively.

Cylinder 43 further contains upper bearing 59 disposed axially outward of or above upper seal 56 and lower bearing 60 disposed axially outward of or below seal 57. These bearings 59 and 60 supports shaft 45 to allow relative reciprocating movement in the axial direction. Bearings 59 and 60 are made, for example, of oil-impregnated sintered metal. Inside cylinder 43, space 61 is provided above upper bearing 59 and the upper end of shaft 45 located within space 61.

Damper 41 is configured as described above.

Immediately above connecting portion 45a of shaft 45 located below and outside cylinder 43, spring receiving plate 62 is attached. Between spring receiving plate 62 and lower bearing 60, spring (compression coil spring) 63 is provided which is capable of expanding and contracting. Suspension 27 is configured in the above described manner and provides elastic support to water tub 26.

FIG. 3 shows lead wire 64 drawn out of cylinder 43 for conducting coil 51 of damper 41.

Next, a description will be given on the operation and effect of the above described structure.

When the operation of a drum washer configured as described above is started in response to the user operation of control panel 24, the rotation of drum 30 containing laundry oscillates water tub 26 mostly in the up and down direction during a wash, dehydrate, and dry steps. In response to the up and down oscillation of water tub 26, cylinder 43 constituting suspension 27 and being connected to water tub 26, oscillates up and down around shaft 45 with extension/contraction of spring 63 along with upper bearing 59, upper seal 56, upper yoke 53, coil 51, lower yoke 54, lower seal 57, and lower bearing 60.

When cylinder 43 oscillates up and down around shaft 45 along with the above described components, magnetic viscous fluid 55 filled between shaft 45, yokes 53 and 54, and coil 51 exerts damping force through frictional resistance imparted by the viscosity to reduce the degree of oscillation of the water tub.

At this instance, conduction of coil 51 further generates magnetic field which is applied to magnetic viscous fluid 55 to increase the viscosity of magnetic viscous fluid 55. More specifically, the conduction of coil 51 generates magnetic circuit M comprising shaft 45—magnetic viscous fluid 55—upper yoke 53—cylinder 43—lower yoke 54—magnetic viscous fluid 55—shaft 45 which significantly increases the viscosity of magnetic viscous fluid 55 residing in the path of magnetic flux which includes, in particular, the space between shaft 45 having relatively high magnetic flux density and upper yoke 53, as well as the space between lower yoke 54 and shaft 45 (magnetic viscous fluid filling portion 58), thereby increasing the imparted frictional resistance. The damping force is thus increased by the increase in the frictional resistance during the up and down oscillation of cylinder 43 oscillating along with the above described components, especially coil 51, upper yoke 53, and lower yoke 54.

Coil 51 is configured to control the viscosity of magnetic viscous fluid 55 by generating a magnetic field corresponding to the level of the flowing current, meaning that the generated magnetic field varies with the level of current to variably control the viscosity of magnetic viscous fluid 55.

The drum washer of the above described configuration obtains damping force by the frictional resistance imparted by the viscosity of magnetic viscous fluid 55 and is provided with seal 57 on one (lower side) of the axial outer sides of lower yoke 54 and upper yoke 53 and also seal 56 on the other (upper side), to trap magnetic viscous fluid 55 within magnetic viscous fluid filling portion 58 at both axial outer sides of magnetic viscous fluid filling portion 58. Because the leakage of magnetic viscous fluid 55 can be prevented, no air is introduced into magnetic viscous fluid filling portion 58, to allow the density of magnetic viscous fluid 55 within magnetic viscous fluid filling portion 58 to be maintained at a favorable level and prevent degradation of damping force.

Bearings 59 and 60 that support shaft 45 are disposed on the axial outer sides of seals 56 and 57. This prevents magnetic viscous fluid 55 from coming in contact with bearings 59 and 60 thereby preventing the acceleration of the wear of bearings 59 and 60 caused by the magnetic particles contained within magnetic viscous fluid 55.

FIGS. 4 and 5 illustrate a second and third embodiment which identifies the portions that are identical to the first embodiment with identical reference symbols. Only the differences from the first embodiment will be described.

In the second embodiment, recesses 71 is formed on upper yoke 53 so as to be located on the upper seal 56 side and the shaft 45 side of upper yoke 53, whereas recess 72 is formed on lower yoke 54 so as to be located on the lower seal 57 side and the shaft 45 side by, for instance, counter boring. Recesses 71 and 72 provide communication between magnetic viscous fluid filling portion 58 and grooves 56b and 57b of seals 56 and 57.

As a result, magnetic viscous fluid 55 is filled from magnetic viscous fluid filling portion 58 to recesses 71 and 72 as well as from recesses 71 and 72 to grooves 56b and 57b of seals 56 and 57. That is, seals 56 and 57 are provided with grooves 56b and 57b serving as fluid receiving portions in the magnetic viscous fluid filling portion 58 side. Further, recesses 71 and 72 are provided between grooves 56b and 57b serving as fluid receiving portions and magnetic viscous fluid filling portion 58 to serve as a communicating portion providing communication between them.

Thus, magnetic viscous fluid 55 filled from magnetic viscous fluid filling portion 58 to recesses 71 and 72 and further to grooves 56b and 57b of seals 56 and 57 reliably increases the degree of pressure contact of seals 56 and 57 (especially lips 56a and 57a) against shaft 45 by a uniform pressure level. The increase in the degree of the pressure contact typically originates from the pressure imparted by heat expansion of magnetic viscous fluid 55 and the increased pressure contact improves the sealing of magnetic viscous fluid 55 within magnetic viscous fluid filling portion 58. This prevents the leakage of magnetic viscous fluid 55 more reliably and better maintains the density of magnetic viscous fluid 55 within magnetic viscous fluid filling portion 58, thereby preventing the degradation of the damping effect even more effectively.

Communicating portion providing communication between grooves 56b and 57b (fluid receiving portions) of seals 56 and 57 and magnetic viscous fluid filling portion 58 may be provided on seals 56 and 57 or on yokes 53 and 54 as well as seals 56 and 57.

In the third embodiment illustrated in FIG. 5, damper 41 is configured up side down as compared to the first embodiment such that the cylinder 43 side of damper 41 is connected to exterior housing 21 and the shaft 45 side is connected to water tub 26.

In such configuration, the shaft 45 side oscillates strongly along with the oscillation of water tub 26 whereas strong oscillation of the cylinder 43 side can be prevented. This especially eliminates the strong oscillation of magnetic viscous fluid 55 in the cylinder 43 side and prevents the leakage of magnetic viscous fluid 55 originating from the strong oscillation. The above described configuration also prevents the leakage of magnetic viscous fluid 55 more reliably and better maintains the density of magnetic viscous fluid 55 within magnetic viscous fluid filling portion 58, thereby preventing the degradation of the damping effect even more effectively.

In the above described configuration, lead wire 64 drawn out of cylinder 43 for the conduction of coil 51 of damper 41 is drawn out from the stationary side and thus, eliminates fatigue of lead wire 64 originating from the oscillation of water tub 26 to prevent disconnection of lead wire 46.

The above described arrangement is enabled by the configuration in which seal 57 is provided on one (lower side) of the axial outer sides of lower yoke 54 and upper yoke 53 and another seal 56 being provided on the other (upper side).

FIG. 7 illustrates an entire view of a drum washer of a fourth embodiment and employs exterior housing 101 as the outermost structure. Exterior housing 101 has laundry inlet/outlet 102 at the central portion of its front side (right side as viewed in FIG. 7) for loading and unloading of laundry which is opened/closed by door 103. On the upper front portion of exterior housing 101, control panel 104 is provided which has controller 105 for controlling the operation of the washer on its bottom side (inside exterior housing 101).

Exterior housing 101 contains water tub (tub) 106. Water tub 106 is configured as a laterally oriented cylinder with its axis extending in the front and rear direction which is oriented in the left and right direction as viewed in FIG. 7. Water tub 106 is elastically supported so as to be inclined forwardly upward by a pair of left and right suspensions 107 (though only one is shown) so as to be located above bottom panel 101a of exterior housing 101. The structure of suspension 107 will be a later described in detail.

On the rear portion of water tub 106, motor 108 is attached. Motor 108 comprises an outer rotor direct current brushless motor. A rotary shaft not shown attached to the central portion of rotor 108a is inserted into water tub 106 through bearing bracket 109.

Water tub 106 contains drum 110. Drum 110 is provided coaxially with water tub 106 and is configured as a laterally oriented cylinder with its axis extending in the front and rear direction. The central rear portion of drum 110 is connected to the tip of the rotary shaft of motor 28 so as to be inclined forwardly upward. Drum 110 is driven in rotation by motor 108 and motor 108 serves as a drum driving unit that drives drum 110.

The peripheral portion or the waist of drum 110 is provided with multiplicity (though only partially shown) of pores 111. Drum 110 and water tub 106 each has openings 112 and 113 respectively at their front sides and opening 113 of water tub 106 communicates with laundry inlet/outlet 102 through annular bellows 114. As a result, laundry inlet/outlet 102 communicates with drum 110 interior through bellows 114, opening 113 of water tub 106, and opening 112 of drum 112.

The bottom rear side portion of water tub 106 is connected to drain tube 116 by way of exhaust valve 115. Dry unit 117 is disposed along the rear side portion, the upper portion, and forward portion of water tub 106. Dry unit 117 comprises dehumidifier 118, blower (blower unit) 119, and heater (heating unit) 120, and dries the laundry by dehumidifying the air inside water tub 106, heating it, and returning the heated air back into water tub 106.

The structure of suspension 107 will be described in detail hereinafter. Suspension 107 is provided with damper 121 and this damper 121 is primarily configured by cylinder 122 and shaft 123. Cylinder 122 is provided with connecting member 124 on its lower end. Connecting member 124 is passed downward through mounting plate 125 provided on bottom panel 101a of exterior housing 101 and secured to bottom panel 101a of exterior housing 127 by nut 127 by way of resilient set plate 126 or the like to mount cylinder 122 on bottom panel 101a of exterior housing 101.

The upper end of shaft 123 is provided with connecting portion 123a and connecting portion 123a is passed upward through mounting plate 28 provided on water tub 106 and secured on water tub 106 by nut 30 by way of resilient set plate 29 or the like to mount shaft 123 on water tub 106. As shown in FIG. 6, in the portion of shaft 123 located above and outside cylinder 122, spring receiving plate 131 is secured by fitting engagement. Between spring receiving plate 131 and upper end of cylinder 122, spring 132 comprising a compression coil spring is provided so as to be fitted over shaft 123 so as to surround shaft 123.

In the inner mid portion of cylinder 122, an annular lower bracket 133 is stored. On the outer periphery of lower bracket 133, groove 133a is formed. The portion of peripheral wall of cylinder 122 corresponding to groove 133a is squeeze caulked into groove 133a to secure lower bracket 133 to cylinder 122. The inner peripheral portion of lower bracket 133 receives bearing 134 which supports shaft 123 so as to be movable in the up and down direction. Bearing 134 is configured, for example, by oil-impregnated sintered metal.

In the inner upper end portion of cylinder 122, an annular upper bracket 135 is stored. On the outer periphery of upper bracket 135, groove 135a is formed. The portion of peripheral wall of cylinder 122 corresponding to groove 135a is squeeze caulked into groove 135a to secure upper bracket 135 to cylinder 122. The inner peripheral portion of upper bracket 135 receives bearing 136 which supports shaft 123 so as to be movable in the up and down direction. Bearing 136 is configured, for example, by oil-impregnated sintered metal. On the upper surface of upper bracket 135 as viewed in FIG. 6, cylindrical portion 135b is provided so as to protrude upward through the opening provided on the upper end of cylinder 122.

In the portion between lower bracket 133 and upper bracket 135 within cylinder 122, coil assembly 137 is stored which is secured by being sandwiched between lower bracket 133 and upper bracket 135. Coil assembly 137 has through hole 138 formed through it to allow insertion and up and down movement of shaft 123. The structure of coil assembly 137 is described in detail in FIGS. 8 to 12.

As shown in FIG. 8, coil assembly 137 is provided with first yoke 139, first coil 140, first bobbin 141 wound with first coil 140, second yoke 142, second coil 143, second bobbin 144 wound with second coil 143, and third yoke 145. Further as shown in FIGS. 8 and 9, coils 140 and 143, bobbins 141 and 144, and yokes 139, 142, and 145 are resin molded (insert molded) with resin 146. FIG. 9 is a perspective view of coil assembly 137 turned up side down.

On each of upper and lower flanges 147 of first bobbin 141 and second bobbin 144 as viewed in FIG. 8, a plurality of protrusions (not shown), such as 4 in number, for locating purposes are provided so as to be substantially equally spaced from one another and so as to protrude upward and downward. On the side surface of first yoke 139 opposing flange 147 of first bobbin 141, recesses (not shown) are formed that establishes a fitting engagement with the protrusions of flange 147. On both of the side surfaces of second yoke 142, 4 through holes 152 are formed (as shown in FIG. 9) and these through holes 152 establish fitting engagement with the protrusions provided on flanges 147 of first bobbin 141 and second bobbin 144. Further, on the side surface of third yoke 145 opposing flange 147 of second bobbin 144, recesses (not shown) are formed that establishes a fitting engagement with the protrusions of flange 147.

On the underside of first yoke 139 as viewed in FIG. 8, an annular recess 149 is formed into which an annular seal member 150 is press fitted. The depth of recess 149 is configured to be substantially equal to the length of seal member 150 taken in the up and down direction as viewed in FIG. 8 such that seal member 150 does not protrude from the side surface (underside) of first yoke 139. Seal member 150 is made of rubber (NBR) and its outer peripheral portion 150a shaped as a short cylinder is press fitted in intimate contact with the inner peripheral portion of the annular recess 149 whereas the tip (upper end) of outer peripheral portion 150a is placed in intimate contact with the inner bottom of recess 149. Further, inner peripheral portion 150b shaped as a short cylinder of seal member 150 is placed in intimate contact with shaft 123 so as to allow the axial movement of shaft 123. Inner peripheral portion 150b has a known lip (not shown) formed so as to face shaft 123, thereby providing a seal to prevent magnetic viscous fluid 164 from leaking into cylinder 122 from between first yoke 139 and shaft 123.

Further, on the upper side surface of third yoke 145 as viewed in FIG. 8, an annular recess 153 is formed into which an annular seal member 154 is press fitted. The depth of recess 153 is configured to be substantially equal to the length of seal member 154 taken in the up and down direction as viewed in FIG. 8 such that seal member 154 does not protrude from the side surface (upper side) of third yoke 145. Seal member 154 is made of rubber (NBR) and its outer peripheral portion 154a shaped as a short cylinder is press fitted in intimate contact with the inner peripheral portion of the annular recess 153 whereas the tip (lower end) of outer peripheral portion 154a is placed in intimate contact with the inner bottom of recess 153. Further, inner peripheral portion 154b shaped as a short cylinder of seal member 154 is placed in intimate contact with shaft 123 so as to allow the axial movement of shaft 123. Inner peripheral portion 154b has a known lip (not shown) formed so as to face shaft 123, thereby providing a seal to prevent magnetic viscous fluid 164 from leaking into cylinder 122 from between first yoke 139 and shaft 123.

In the above described configuration, flange 147 of first bobbin 141 is placed in contact with the side surface of first yoke 139, flanges 147 first bobbin 141 and second bobbin 144 are placed in contact with both side surface of second yoke 142, and further flange 147 of second bobbin 144 is placed in contact with third bobbin 145 as shown in FIG. 8. Then, the assembly of yokes 139, 142, 145, and bobbins (coil 140 and 143) 141 and 144 are placed within a mold (not shown) and resin molded (insert molded) with resin 146. Resin 146 may comprise thermoplastic resin (such as nylon, PBT, PET, PP). As shown in FIG. 8, resin 146 covers the outer peripheral portions of coils 140 and 143 and bobbins 141 and 144, as well as the axial upper portion of the outer peripheral portion of first yoke 139, and further the axial lower portion of the outer peripheral portion of third yoke 145.

Resin 146 is further filled into a ring shaped groove 139a formed on the outer peripheral portion of first yoke 139 and into plurality of grooves 142a (shown in FIG. 10), such as 4 in number, provided at substantially equal interval on the outer peripheral portion of second yoke 142 so as to expose the remaining portions of second yoke 142. Resin 146 is further filled into a ring shaped groove 145a formed on the outer peripheral portion of third yoke 145. The exposed portion of the outer peripheral portion of yoke 142 is configured to reduce the magnetic resistance produced between the later described cylinder. Among the 4 grooves 142a of second yoke 142, groove 142a located on the upper portion of FIG. 10 is formed relatively wider in width as compared to the rest of the three grooves 142a.

Next, a description will be given on the inner diameter dimension of through hole 138 (for insertion of shaft 123) provided on the resin molded coil assembly 137. The inner diameters of the 3 yokes 139, 142, and 145 are configured substantially equal such that a gap of approximately 0.4 mm is created between the outer peripheral surface of shaft 123 and the yokes 139, 142, and 145. The inner diameters of the 2 bobbins 141 and 144 are configured substantially equal and slightly greater than the inner diameters of the 3 yokes 139, 142, and 145 such that a gap of approximately 1.0 mm is created between the outer peripheral surface of shaft 123 and the 2 bobbins 141 and 144.

Further in the central portion of the relatively wide groove 142a located in the upper portion of second yoke 142 as viewed in FIG. 10, through hole 142b is formed so as to communicate the inner peripheral portion and the outer peripheral portion of second yoke 142 as shown in FIGS. 9 and 12. Within through hole 142b, pipe 155 having a threaded outer peripheral surface is screw engaged. Pipe 155 is an element for injection filling magnetic viscous fluid 164.

Further, the 2 coils 140 and 143 are series connected and lead wire 156 is connected to the terminals of the 2 coils 140 and 143. Lead wires 156 are drawn outside from portion molded by resin 146 and more specifically from the relatively wide groove 142a located in the upper portion of second yoke 142 as viewed in FIG. 10. As shown in FIGS. 9 and 11, within the wide groove 142a of second yoke 192, rubber or resin made support piece 157 is provided for supporting lead wires 156 and is molded with resin 146. Support piece 157 has T-shaped support hole 157a formed in it and lead wires 156 are disposed within support hole 157a. Support piece 157 is divided into 2 parts along support hole 157a in order to hold lead wires 156 inside support hole 157a. Lead wires 156 is drawn toward support piece 157 by way of guide groove (not shown) formed from coils 140 and 143 to flanges 147 of bobbins 141 and 144.

As shown in FIGS. 9 and 12, on the portion corresponding to through hole 142b (groove 142a) of the resin 146 mold, a substantially circular recess 158a is formed which includes receiving groove 159 extending downward (upward as viewed in FIG. 9) from recess 158a for receiving lead wires 156. On the portion of the outer peripheral portion of first yoke 139 corresponding to receiving groove 159, receiving groove 139b is formed for receiving lead wires 156.

Next, a description will be given on how coil assembly 137 molded by resin 146 is installed in cylinder 122. As shown in FIG. 6, upper bracket 135 having bearing 136 attached to it is disposed inside cylinder 122. Then, the portion of peripheral wall of cylinder 122 corresponding to groove 135a is squeeze caulked into groove 135a to secure upper bracket 135 to cylinder 122 (FIG. 6 shows the state prior to the caulking).

Regarding coil assembly 137, lead wire 156 drawn out from resin molded portion (support piece 157) is placed in recess 158, receiving groove 159, and receiving groove 139b such that lead wire 156 does not protrude from the outer peripheral portion of coil assembly 137 as shown in FIGS. 9, 10, 11, and 12. Further, seal member 150 is fitted (press fitted) into recess 149 of first yoke 139 of coil assembly 137 and seal member 154 is fitted (press fitted) into recess 153 of third yoke 145.

Then, coil assembly 137 having lead wire 156 organized as described above and having seal members 150 and 154 mounted on it is installed in cylinder 122 (refer to FIG. 6). At this instance, coil assembly 137 is installed in cylinder 122 such that recess 158 of coil assembly 137 is located with hole 160 (refer to FIG. 12) formed on the peripheral wall of cylinder 122. Thereafter, lead wires 156 are drawn out of cylinder 122 from hole 160. Further, as shown in FIG. 12, lead wire 156 is passed through a hole formed on a rubber or resin made bush 161 and bush 161 is fitted into hole 160 of cylinder 122. Lead wire 156 drawn out of bush 161 is connected to a control circuit (controller 105) that controls the conduction of coils 140 and 143.

Then, as shown in FIG. 6, lower bracket 133 having bearing 134 attached to it is disposed inside cylinder 122 whereafter the portion of peripheral wall of cylinder 122 corresponding to groove 133a is squeeze caulked into groove 133a to secure lower bracket 133 to cylinder 122 (FIG. 6 shows the state prior to the caulking).

Next, prior to the attachment of spring receiving plate 131 to shaft 123, shaft 123 is inserted into cylinder 122 and passed through the openings of lower bracket 133, bearing 134, seal member 150, first yoke 139, first bobbin 141 (first coil 140), second yoke 142, second bobbin 144 (second coil 143), third yoke 145, seal member 154, bearing 136, and upper bracket 135 in the listed sequence to protrude upward from cylinder 122.

Shaft 123 is thus, supported by bearings 134 and 136 and allowed relative and reciprocating movement in the axial direction (up and down direction) with respect to bearing 134, seal member 150, first yoke 139, first bobbin 141 (first coil 140), second yoke 142, second bobbin 144 (second coil 143), third yoke 145, seal member 154, and bearing 136. On the lower end of shaft 123, stop ring 162 is attached to prevent dislocation of shaft 123 and space 163 is provided inside cylinder 122 below stop ring 162.

Then, on the portion of shaft 123 located outside and above cylinder 122, spring receiving plate 131 is fitted. Between spring receiving plate 131 and upper end of cylinder 122, coil spring 132 comprising a compression coil spring is fitted over shaft 123 so as to surround shaft 123.

Further, in the space between shaft 123 and bobbins 141 and 144 (coils 140 and 143) and the space between shaft 123 and yokes 139, 142, and 145 in the vicinity of the former, magnetic viscous fluid 164 is injection filled (as shown in FIGS. 6 and 8). Magnetic viscous fluid 164 is sealed by seal members 150 and 154 so as not to leak into cylinder 122 from the space between yokes 139 and 145 and shaft 123.

When injecting magnetic viscous fluid 164 into the above described spaces, a tube (not shown) is connected to pipe 155 with bush 161 shown in FIG. 12 removed from hole 160 formed on peripheral wall of cylinder 122. Then, the air within the above described spaces is exhausted (vacuumed) and magnetic viscous fluid 164 is injected into the above described spaces with the tube. After the injection of magnetic viscous fluid 164, the opening of pipe 155 is sealed with a seal member (not shown) whereafter bush 161 is fitted into hole 160 of cylinder 122.

Suspension 107 configured as described above is installed between water tub 106 and bottom panel 101a of exterior housing 101 so as to support water tub 106 above bottom panel 101a of exterior housing 101 with minimized oscillation.

In the above described embodiment, seal members 150 and 154 are fitted (press fitted) into recesses 149 and 153 formed on first yoke 139 and third yoke 145 of coil assembly 137. Thus, unlike related configurations, the degree of intimate contact between inner peripheral portions 150b and 154b of seal member 150 and 154 and shaft 123 and the degree of intimate contact between outer peripheral portions 150a and 154a of seal members 150 and 154 and recesses 149 and 153 can be improved to a sufficient level irrespective of factors such as assembly variance and oscillation. That is, in a typical related configuration, sealing capability was obtained by applying, on the seal member, a pressure oriented in the axial direction. Such axial pressure is no longer required in the above described embodiment. Thus, in the above described embodiment, leakage of magnetic viscous fluid 164 into cylinder 122 from either of the space between upper yoke 139 and shaft 123 and the space between lower yoke 145 and shaft 123 can be prevented by seal member 150 and 154. As a result, not only the downward gravitational movement of magnetic viscous fluid 164 is reliably prevented but also the upward and downward movement of magnetic viscous fluid 164 caused by the up and down movement of shaft 123, thereby preventing degradation of oscillation damping force and property variation as well as stabilizing the start of the dehydrate operation.

Further in the above described embodiment, coil assembly 137 is put together by molding coils 140 and 143; bobbins 141 and 144; and yokes 139, 142 and 145 with resin 146. Thus, gaps created between the components due to dimension error or assembly error when yokes 139, 142, and 145 are secured on the end portions of bobbins 141 and 144 may be sealed by resin 146. Accordingly, leakage of magnetic viscous fluid 164 from the gaps can be prevented. Further, bobbins 141 and 144 and yokes 139, 142, and 145 can be secured together with greater strength. Still further, seal members 150 and 154 are provided on both upper and lower ends of coil assembly 137 and thus, there is no risk of magnetic viscous fluid 164 leaking even when suspension 107 has to be mounted up side down.

FIG. 13 illustrates a fifth embodiment. Elements that are identical to the fourth embodiment are identified with identical reference symbols. The fifth embodiment is configured such that the axial (up and down) length of first yoke 139 and third yoke 145 are increased and the depth (vertical dimension) of recesses 149 and 153 are increased to store bearings 134 and 136 into recesses 149 and 153 in addition to seal members 150 and 154. The dislocation of bearing 134 is prevented by stop ring 165. Lower bracket 133 is eliminated and the axial (up and down direction) length of upper bracket 135 is shortened. On the peripheral portions of yokes 139 and 145, grooves 139c and 145c are formed for caulking of cylinder 122.

Apart from the above described configuration, the fifth embodiment is identical to the fourth embodiment. Thus, the operation and effect similar to those of the fourth embodiment can be obtained in the fifth embodiment. Especially in the fifth embodiment, misalignment between shaft 123 and bearings 134 and 136 can be reduced to prevent leakage of magnetic viscous fluid 164 from the space between shaft 123 and seal members 150 and 154 which would occur when encountering relatively large misalignment. Further, the elimination of lower bracket 133 reduces the required number of parts.

FIG. 14 illustrates a sixth embodiment. Elements that are identical to the fourth embodiment are identified with identical reference symbols. In the sixth embodiment, O-ring 166 is provided between yokes 139, 142, and 145 and between flanges 147 of bobbins 141 and 144. More specifically, annular grooves (recesses) 167 are provided on the side surfaces (the side surfaces that contact flanges 147) of yokes 139, 142, and 145 and groove 167 is configured to receive O-ring 166.

Apart from the above described configuration, the sixth embodiment is identical to the fourth embodiment. Thus, the operation and effect similar to those of the fourth embodiment can be obtained in the sixth embodiment. In the sixth embodiment, O-ring 166 is disposed between yokes 139, 142, and 145 and flanges 147 of bobbins 141 and 144. Thus, leakage of magnetic viscous fluid 164 from the space between yokes 139, 142, and 145 and flanges 147 of bobbins 141 and 144 can be prevented even more effectively.

FIG. 15 illustrates a seventh embodiment. Elements that are identical to the fifth and the sixth embodiment are identified with identical reference symbols. The seventh embodiment is configured such that the depth (vertical dimension) of recesses 149 and 153 of the first yoke 139 and third yoke 145 are increased to store bearings 134 and 136 into recesses 199 and 153 while O-ring 166 is disposed between yokes 139, 142, and 145 and flanges 147 of bobbins 141 and 144. Apart from the above described configuration, the seventh embodiment is identical to the fifth and the sixth embodiment. Thus, the operation and effect similar to those of the fifth and the sixth embodiment can be obtained in the seventh embodiment.

FIG. 16 illustrates an eighth embodiment. Elements that are identical to the fourth embodiment are identified with identical reference symbols. In the eighth embodiment, yokes 139, 142, and 145 are bonded to flanges 147 of bobbins 141 and 144 with adhesive 168. Apart from the above, the eighth embodiment is substantially identical to the fourth embodiment. Thus, the operation and effect similar to those of the fourth embodiment can be obtained in the eighth embodiment. In the eighth embodiment, the spaces between yokes 139, 142, and 195 and flanges 147 of bobbins 141 and 144 are sealed together with adhesive 168. Thus, leakage of magnetic viscous fluid 164 from the space between yokes 139, 142, and 145 and flanges 147 of bobbins 141 and 144 can be prevented even more effectively.

FIG. 17 illustrates as ninth embodiment. Elements that are identical to the fifth and the eighth embodiment are identified with identical reference symbols. The ninth embodiment is configured such that the depth (vertical dimension) of recesses 149 and 153 of the first yoke 139 and third yoke 145 are increased to store bearings 134 and 136 and yokes 139, 142, and 145 are bonded to flanges 147 of bobbins 141 and 144 with adhesive 168. Apart from the above, the ninth embodiment is substantially identical to the fifth and the eighth embodiment. Thus, the operation and effect similar to those of the fifth and eighth embodiment can be obtained in the ninth embodiment.

FIG. 18 illustrates a tenth embodiment. Elements that are identical to the fourth embodiment are identified with identical reference symbols. In the tenth embodiment, the assembly of yokes 139, 142, and 145 and bobbins (coils 140 and 143) 141 and 144 are molded with resin 146. In doing so, resin 146 is configured to cover the outer peripheral surfaces of yokes 139, 142, and 145 so as to reside further outward from the outer peripheral surfaces as shown in FIG. 18. Apart from the above, the tenth embodiment is substantially identical to the fourth embodiment. Thus, the operation and effect similar to those of the fourth embodiment can be obtained in the tenth embodiment. In the tenth embodiment, resin 146 is configured to cover the outer peripheral surfaces of yokes 139, 142, and 145. Thus, the strength of coil assembly 137 (that is, the strength in which coil, bobbin, and yoke are secured together) can be increased in a greater magnitude while preventing the leakage of magnetic viscous fluid 164 from the space between yokes 139, 142, and 145 and flanges 147 of bobbins 141 and 144 even more effectively. Resin 146 located on the outer peripheral surface of yokes 139, 142, and 145 serves as magnetic resistance between coil assembly 137 and cylinder 146 and thus, is made as thin as possible as compared to resin 146 located in other portions to minimize the increase in magnetic resistance.

FIGS. 19 to 22 illustrate an eleventh embodiment. Elements that are identical to the fourth embodiment are identified with identical reference symbols. In the eleventh embodiment, O-ring 171 is provided between yokes 139, 142, and 145 and between flanges 147 of bobbins 141 and 144.

More specifically, as shown in FIGS. 19 and 20, cylindrical sections of bobbins 141 and 144 extend outward so as to form annular protrusions 172 on outer surfaces of flanges 147. On the side surfaces (the side surfaces that oppose flanges 147) of yokes 139, 142, and 145 annular fitting portions 173 for fitting engagement with annular protrusions 172 is provided. Further, annular receiving portion (recess) 174 is provided so as to be in stepped continuation with annular fitting portion 173. The aforementioned O-ring 171 is disposed within annular receiving portion 174 (refer to FIG. 22).

Further as shown in FIG. 21, O-ring 171 is configured such that A>B when A represents the thickness (that is, the diameter of the cross section) of O-ring 171 and B represents the depth of annular receiving portion 174 taken in the axial direction (the up and down direction as viewed in FIG. 20). Thus, as shown in FIG. 22, O-ring 171 is held between the inner surface of annular receiving portion 174 (opposing flange 147) and flange 147 so as to be pressured deformed by suitable force. As a result, leakage of magnetic viscous fluid 164 from the space between yokes 139, 142, and 145 and flanges 147 of bobbins 141 and 144 can be prevented even more effectively by the above described O-ring 171.

Further in the above described configuration, O-ring 171 is configured such that S1>S2 when S1 (refer to FIG. 20) represents the cross sectional area of annular receiving portion 174 and when S2 represents the cross sectional area of O-ring 171, wherein S1 is configured to approximate S2 as much as possible. Thus, when O-ring 171 is pressure deformed (deformation of O-ring 171 does not change cross sectional area S2), O-ring 171 stays within annular receiving portion 174 to maintain the sealing capability of O-ring 171 at a constant level.

O-ring 171 is made of elastic and highly heat resistive material such as silicon rubber or fluorine rubber. Because O-ring 171 is sufficiently heat resistive, O-ring 171 maintains its sealing capability even when heated up to approximately 200° C. when coils 140 and 143, bobbins 141 and 144, and yokes 139,142, and 145 are molded by resin 146.

Apart from the above, the eleventh embodiment is substantially identical to the fourth embodiment. Thus, the operation and effect similar to those of the fourth embodiment can be obtained in the eleventh embodiment. In the eleventh embodiment, O-ring 171 is disposed within annular receiving portion 174 such that O-ring 171 resides between yokes 139, 142, and 145 and flanges 147 of bobbins 141 and 144. Thus, leakage of magnetic viscous fluid 164 from the space between yokes 139, 142, and 145 and flanges 147 of bobbins 141 and 144 can be prevented even more effectively.

Further in the eleventh embodiment, O-ring 171 is configured such that A>B when A represents the diameter (thickness) of O-ring 171 and B represents the depth of annular receiving portion 174 taken in the axial direction (the up and down direction as viewed in FIG. 20). Thus, O-ring 171 is held between the inner surface of annular receiving portion 174 and flange 147 so as to be pressured deformed by suitable force, thereby obtaining sufficient sealing capability. Still further, O-ring 171 is configured such that S1>S2 when S1 represents the cross sectional area of annular receiving portion 174 and when S2 represents the cross sectional area of O-ring 171. Thus, when O-ring 171 is pressure deformed, O-ring 171 stays within annular receiving portion 174 to maintain the sealing capability of O-ring 171 at a constant level.

Still further, O-ring 171 is made of elastic and highly heat resistive material such as silicon rubber or fluorine rubber. Because O-ring 171 is sufficiently heat resistive, O-ring 171 maintains its sealing capability even when heated up to approximately 200° C. when coils 140 and 143, bobbins 141 and 144, and yokes 139,142, and 145 are molded by resin 146.

FIGS. 23 and 24 illustrate a twelfth embodiment. Elements that are identical to the eleventh embodiment are identified with identical reference symbols. As shown in FIGS. 23 and 24, in the twelfth embodiment, annular protrusions 175 are formed on a portion of flanges 147 of yokes 139, 142, and 145. Annular protrusions 175 are configured to pressure deform O-rings 171.

Apart from the above described configuration, the twelfth embodiment is identical to the eleventh embodiment. Thus, the operation and effect similar to those of the eleventh embodiment can be obtained in the twelfth embodiment. In the twelfth embodiment, annular protrusions 175 are configured to pressure deform O-rings 171, thereby largely deforming O-ring to improve the sealing capability of O-ring 171.

Further, in the twelfth embodiment, annular protrusions 175 are provided on flanges 147. Alternatively, annular protrusions 175 may be provided on the inner surfaces (opposing flanges 147) of annular receiving portions 174 of yokes 139, 142, and 145.

FIGS. 25 and 27 illustrate a thirteenth embodiment. Elements that are identical to the eleventh embodiment are identified with identical reference symbols. In the thirteenth embodiment, d1<D1 and d2>D2 when D1 represents the outer diameter of annular protrusions 172 of bobbins 141 and 144, D2 represents the inner diameter of annular recesses 174 of yoke 139, 142, and 195 as shown in FIGS. 25 and 26, d1 represents the inner diameter of O-ring 171, and d2 represents the outer diameter of O-ring 171. In the above configuration, O-ring 171 is configured such that S1>S2 when S1 represents the cross sectional area of annular receiving portion 174 and when S2 represents the cross sectional area of O-ring 171, wherein S1 is configured to approximate S2 as much as possible.

In the above described configuration, because d1<D1, the inner peripheral portion of O-ring 171 is placed intimate contact with the outer peripheral portion of annular protrusion 172. Further, because d2>D2, the outer peripheral portion of O-ring 171 is placed in intimate contact with the inner peripheral portion of annular receiving portion of 174. That is, O-ring 171 is deformed by pressure applied by the inner-to-outer fitting engagement (the fitting engagement oriented in the left and right direction of FIG. 26) to obtain a sealing capability which in turn prevents leakage of magnetic viscous fluid 164 from the space between yokes 139, 142, and 145 and flanges 147 of bobbins 141 and 144.

Apart from the above described configuration, the thirteenth embodiment is identical to the eleventh embodiment. Thus, the operation and effect similar to those of the eleventh embodiment can be obtained in the thirteenth embodiment.

FIG. 28 illustrates a fourteenth embodiment. Elements that are identical to the eleventh embodiment are identified with identical reference symbols. In the fourteenth embodiment, a couple of annular protrusions 176 and 177 protruding outward are formed on the outer surfaces of flanges 147 of bobbins 141 and 144 so as to be located on the outer peripheral portion of O-ring 171. A couple of annular fitting portions 178 and 179 for fitting engagement with annular protrusions 176 and 177 are provided on the side surfaces (the surfaces opposing flanges 147) of yokes 139, 142, and 145. According to the above configuration, a labyrinth seal structure is formed on the outer peripheral portion of O-rings 171 by the fitting engagement of annular protrusions 176 and 177 of flanges 147 and annular fitting portions 178 and 179 of yokes 139, 142, and 145 in addition to the sealing structure of O-rings 171.

Apart from the above described configuration, the fourteenth embodiment is identical to the eleventh embodiment. Thus, the operation and effect similar to those of the eleventh embodiment can be obtained in the fourteenth embodiment. In the fourteenth embodiment, a labyrinth seal structure is provided through the fitting engagement of annular protrusions 176 and 177 of flanges 147 and annular fitting portions 178 and 179 of yokes 139, 142, and 145 in addition to the sealing structure of O-rings 171. Thus, preventing the leakage of magnetic viscous fluid 164 from the space between yokes 139, 142, and 145 and flanges 147 of bobbins 141 and 144 can be prevented even more effectively.

Other Embodiments

The foregoing embodiments may further incorporate the following configurations.

In each of the above described embodiments, 2 coils 140 and 143 (bobbins 141 and 144) are provided. Alternatively, 1 or 3 or more coils (bobbins) may be provided. By optimizing the number of coils (bobbins) and yokes depending upon the use such as the volume of laundry, oscillation damping force can be optimized depending upon usage.

In the sixth, seventh, and eleventh to fourteenth embodiments, grooves 167 and annular receiving portions 174 serving as the recesses for receiving O-rings 166 and 171 are provided on yokes 139, 142, and 145. Alternatively, the recesses for receiving O-rings 166 and 171 may be provided on flanges 147 of bobbins 141 and 144.

Further in the fourteenth embodiment, the labyrinth structure provided on the outer peripheral portion of O-ring 171 may be provided on the inner peripheral portion of O-ring 171 or on both the inner and outer peripheral portions of O-ring 171.

In the sixth, seventh, and eleventh to fourteenth embodiments, O-rings 166 and 171 are employed that have a circular cross section (refer to FIG. 21). Alternatively, O-rings 166 and 171 having square, rectangular, pentagonal, hexagonal, oval or the like shapes may be employed instead. O-rings 166 and 171 may be produced by molding using a vertical die, shaping a string of extrusion molded material into a ring, blanking a sheet into a ring shape, or the like.

As described above, the damper for use in a washer exemplified in the foregoing embodiments provides recesses for receiving a seal member on the yokes disposed on both sides of resin molded structure and press fits the seal member into the recesses. Thus, leakage of magnetic viscous fluid is reliably prevented to eliminate the risk of leakage from both the upper side and the lower side, thereby allowing the orientation of the suspension to be designed more flexibly while keeping the magnetic viscous fluid within magnetic viscous fluid filling portion in a favorable density without allowing degradation in damping force.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A damper comprising:
    a cylinder;
    a coil disposed inside the cylinder;
    a plurality of yokes disposed inside the cylinder so that one of the yokes is located at each axial end of the coil, respectively, and being configured to form a magnetic circuit within the cylinder;
    a magnetic viscous fluid retained on inner surfaces of the yokes and the coil;
    a plurality of seals disposed inside the cylinder so as to be located axially outside the yokes, the seals being configured to maintain the retention of the magnetic viscous fluid on the inner surfaces of the yokes and the coil by preventing leakage of the magnetic viscous fluid;
    a shaft which is supported so as to be axially reciprocable relative to the yokes, the coil, and the seals such that reciprocation of the shaft does not substantially displace the magnetic viscous fluid between the seals; and
    a plurality of bearings disposed axially outside the seals, the bearings being configured to support the shaft.

2. The damper according to claim 1, further comprising a bobbin disposed inside the cylinder and being wound with the coil, wherein the yokes are provided with recesses for receiving the seals, the seals being pressed into the recesses.

3. The damper according to claim 2, wherein an axial depth of the recesses is relatively increased to receive the bearings that support the shaft.

4. The damper according to claim 2, further comprising a plurality of O-rings disposed between flanges of the bobbin and the yokes, the O-rings being configured to prevent leakage of the magnetic viscous fluid.

5. The damper according to claim 2, wherein the bobbin and the yokes are bonded with an adhesive.

6. The damper according to claim 4, wherein either the flanges of the bobbin or the yokes are provided with annular recesses which are configured to receive the O-rings.

7. The damper according to claim 6, wherein the remaining other of the flanges of the bobbin or the yokes are provided with protrusions that are configured to press the O-rings received within the annular recesses.

8. The damper according to claim 6, wherein a depth of the annular recesses is less than a thickness of the O-rings.

9. The damper according to claim 8, wherein a cross sectional area of the annular recesses is greater than a cross sectional area of the O-rings.

10. The damper according to claim 6, wherein cylindrical sections of the bobbin extend outward so as to form annular protrusions on outer surfaces of the flanges, the O-rings being held between outer peripheral surfaces of the protrusions and inner peripheral surfaces of the annular recesses formed on the yokes, and wherein $d1<D1$ and $d2>D2$ when $D1$ represents an outer diameter of the protrusions of the bobbin, $D2$ represents an inner diameter of annular recesses of the yokes, $d1$ represents an inner diameter of the O-rings, and $d2$ represents an outer diameter of the O-rings.

11. The damper according to claim 6, wherein a labyrinth seal structure is provided on inner peripheral portions or outer peripheral portions of the O-rings disposed on the flanges of the bobbin and the yokes.

12. The damper according to claim 6, wherein the O-rings comprise an elastic and heat resistive material.

13. The damper according to claim 2, further comprising a resin configured to mold the coil, the bobbin, and the yokes, and O-rings disposed between a flanges of the bobbin and the yokes, the O-rings being configured to prevent leakage of the magnetic viscous fluid.

14. The damper according to claim 1, wherein each of the seals is provided with a fluid receiving portion on a magnetic viscous fluid filled portion side, and a communicating portion that communicates the fluid receiving portion and the magnetic viscous fluid filled portion.

15. A washing machine comprising:
    an exterior housing;
    a tub disposed inside the tub;
    a rotary tub driven in rotation within the tub;
    a suspension provided with a damper configured to elastically support the tub inside the exterior housing and to reduce oscillation of the tub, the damper including:
        a cylinder;
        a coil disposed inside the cylinder;
        a plurality of yokes disposed inside the cylinder so that one of the yokes is located at each axial end of the coil, respectively, and being configured to form a magnetic circuit within the cylinder;
        a magnetic viscous fluid retained on inner surfaces of the yokes and the coil;
        a plurality of seals disposed inside the cylinder so as to be located axially outside the yokes, the seals being configured to maintain the retention of the magnetic viscous fluid on the inner surfaces of the yokes and the coil by preventing leakage of the magnetic viscous fluid;

a shaft which is supported so as to be axially reciprocable relative to the yokes, the coil, and the seals such that reciprocation of the shaft does not substantially displace the magnetic viscous fluid between the seals; and a plurality of bearings disposed axially outside the seals, the bearings being configured to support the shaft.

16. The washing machine according to claim 15, further comprising a bobbin disposed inside the cylinder and being wound with the coil, wherein the yokes are provided with a recesses for receiving the seals, the seals being pressed into the recesses.

17. The washing machine according to claim 16, further comprising a plurality of O-rings disposed between flanges of the bobbin and the yokes, the O-rings being configured to prevent leakage of the magnetic viscous fluid.

18. The washing machine according to claim 17, wherein either the flanges of the bobbin or the yokes are provided with annular recesses which are configured to receive the O-rings.

19. The washing machine according to claim 18, wherein a depth of the annular recesses is less than a thickness of the O-rings.

20. The washing machine according to claim 19, wherein a cross sectional area of the annular recesses is greater than a cross sectional area of the O-ring.

21. The washing machine according to claim 18, wherein cylindrical sections of the bobbin extend outward so as to form annular protrusions on outer surfaces of the flanges, the O-rings being held between outer peripheral surfaces of the protrusions and inner peripheral surfaces of the annular recesses formed on the yokes, and wherein $d1<D1$ and $d2>D2$ when D1 represents an outer diameter of the protrusions of the bobbin, D2 represents an inner diameter of annular recesses of the yokes, d1 represents an inner diameter of the O-rings, and d2 represents an outer diameter of the O-rings.

22. The washing machine according to claim 18, wherein the O-rings comprise an elastic and heat resistive material.

23. The washing machine according to claim 16, further comprising a resin configured to mold the coil, the bobbin, and the yokes, and O-rings disposed between flanges of the bobbin and the yokes, the O-rings being configured to prevent leakage of the magnetic viscous fluid.

24. The washing machine according to claim 15, wherein each of the seals is provided with a fluid receiving portion on a magnetic viscous fluid filled portion side, and a communicating portion that communicates the fluid receiving portion and the magnetic viscous fluid filled portion.

25. The washing machine according to claim 15, wherein the damper is connected to the exterior housing at the cylinder side and connected to the tub at the shaft side.

26. A washer dryer comprising:
an exterior housing;
a tub disposed inside the tub;
a rotary tub driven in rotation within the tub;
a suspension provided with a damper configured to elastically support the tub inside the exterior housing and to reduce oscillation of the tub;
a heater configured to generate warm air; and
a blower configured to blow the warm air into the rotary tub;
wherein the damper includes:
a cylinder;
a coil disposed inside the cylinder;
a plurality of yokes disposed inside the cylinder so that one of the yokes is located at axial end of the coil, respectively, and being configured to form a magnetic circuit within the cylinder;
a magnetic viscous fluid retained on inner surfaces of the yokes and the coil;
a plurality of seals disposed inside the cylinder so as to be located axially outside the yokes, the seals being configured to maintain the retention of the magnetic viscous fluid on the inner surfaces of the yokes and the coil by preventing leakage of the magnetic viscous fluid;
a shaft which is supported so as to be axially reciprocable relative to the yokes, the coil, and the seals such that reciprocation of the shaft does not substantially displace the magnetic viscous fluid between the seals; and
a plurality of bearings is disposed axially outside the seals, the bearings being configured to support the shaft.

27. A washer dryer according to claim 26, wherein the yokes are provided with a recesses for receiving the seals, the seals being pressed into the recesses.

* * * * *